United States Patent
Lee et al.

(10) Patent No.: US 12,144,008 B2
(45) Date of Patent: Nov. 12, 2024

(54) METHOD AND APPARATUS FOR PERFORMING POSITION-BASED SIDELINK COMMUNICATION IN WIRELESS COMMUNICATION SYSTEM

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 17/430,747

(22) PCT Filed: Feb. 17, 2020

(86) PCT No.: PCT/KR2020/002228
§ 371 (c)(1),
(2) Date: Aug. 13, 2021

(87) PCT Pub. No.: WO2020/167092
PCT Pub. Date: Aug. 20, 2020

(65) Prior Publication Data
US 2022/0141815 A1    May 5, 2022

Related U.S. Application Data

(60) Provisional application No. 62/809,713, filed on Feb. 24, 2019, provisional application No. 62/806,723, filed on Feb. 15, 2019.

(51) Int. Cl.
*H04W 72/51*    (2023.01)
*H04L 1/1812*    (2023.01)
*H04W 72/20*    (2023.01)
*H04W 92/18*    (2009.01)

(52) U.S. Cl.
CPC ........... *H04W 72/51* (2023.01); *H04L 1/1812* (2013.01); *H04W 72/20* (2023.01); *H04W 92/18* (2013.01)

(58) Field of Classification Search
CPC ...................... H04L 2001/0093; H04W 76/14
USPC ...................................................... 455/452.1
See application file for complete search history.

(56) References Cited

U.S. PATENT DOCUMENTS

| | | | |
|---|---|---|---|
| 10,057,935 B2 | 8/2018 | Sartori et al. | |
| 2017/0013497 A1* | 1/2017 | Lee | H04W 28/0268 |
| 2018/0063816 A1 | 3/2018 | Gulati et al. | |
| 2019/0053203 A1 | 2/2019 | Xu et al. | |
| 2020/0260214 A1* | 8/2020 | Wu | H04W 4/40 |
| 2021/0345313 A1* | 11/2021 | Basu Mallick | H04L 1/1825 |
| 2022/0085923 A1* | 3/2022 | Ye | H04L 1/1825 |

(Continued)

FOREIGN PATENT DOCUMENTS

WO    2016135790    9/2016

*Primary Examiner* — Fabricio R Murillo Garcia
(74) *Attorney, Agent, or Firm* — BRYAN CAVE LEIGHTON PAISNER LLP

(57) ABSTRACT

Proposed is a method for operating a first device (100) in a wireless communication system. The method may comprise the steps of: receiving, from a second device, a sidelink service and at least one ID associated with the sidelink service; and determining a communication range associated with the second device on the basis of mapping information and the at least one ID associated with the received sidelink service.

18 Claims, 25 Drawing Sheets

(56) References Cited

U.S. PATENT DOCUMENTS

| | | | |
|---|---|---|---|
| 2022/0086602 A1* | 3/2022 | Ashraf | H04W 4/44 |
| 2022/0264554 A1* | 8/2022 | Hui | H04W 4/02 |

* cited by examiner

FIG. 4
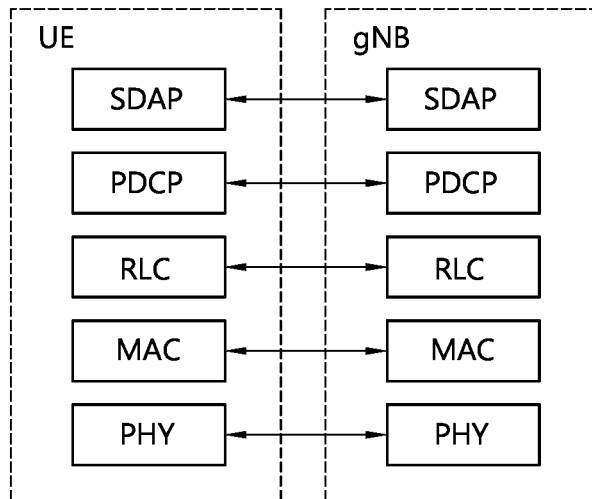
(a)
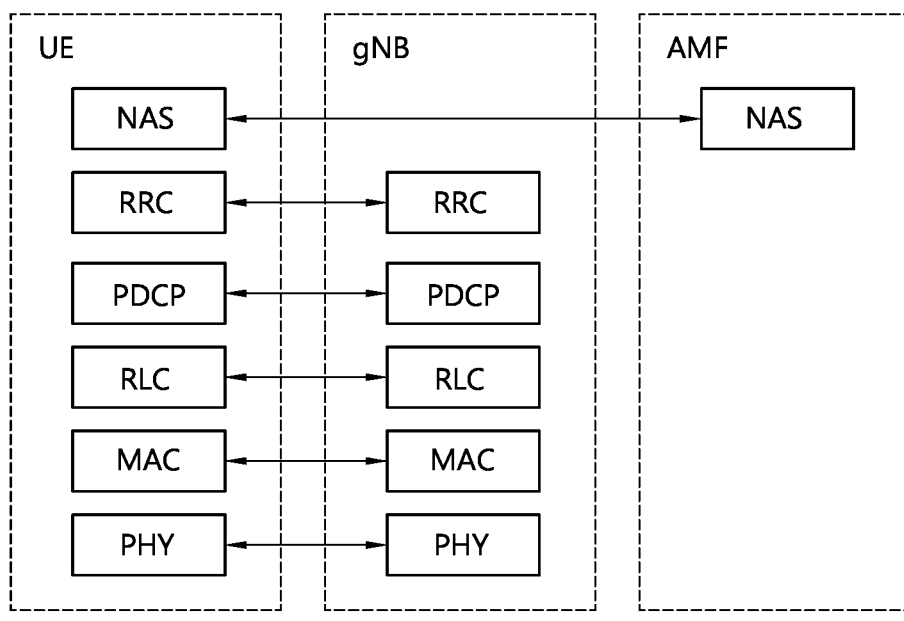
(b)

FIG. 8
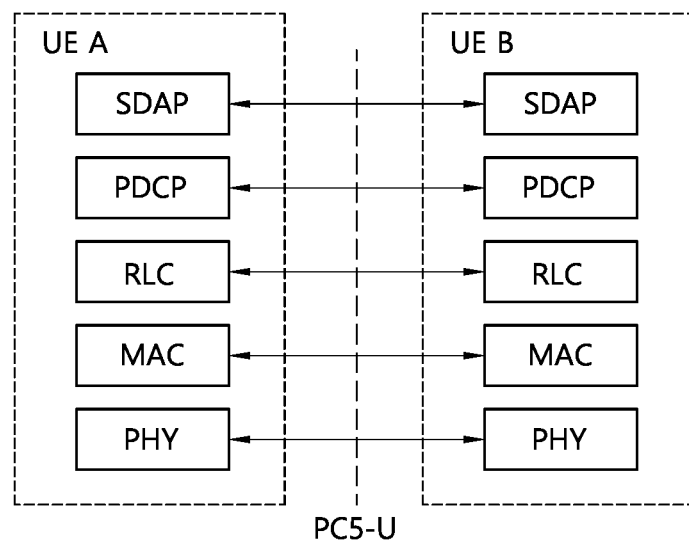
(a)
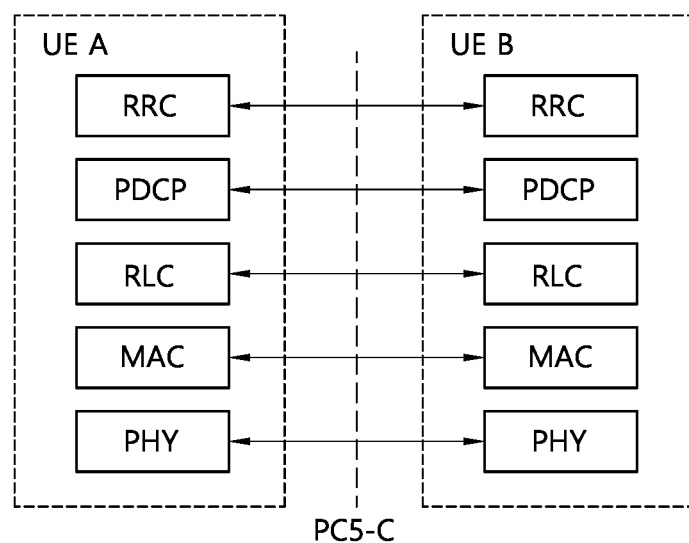
(b)

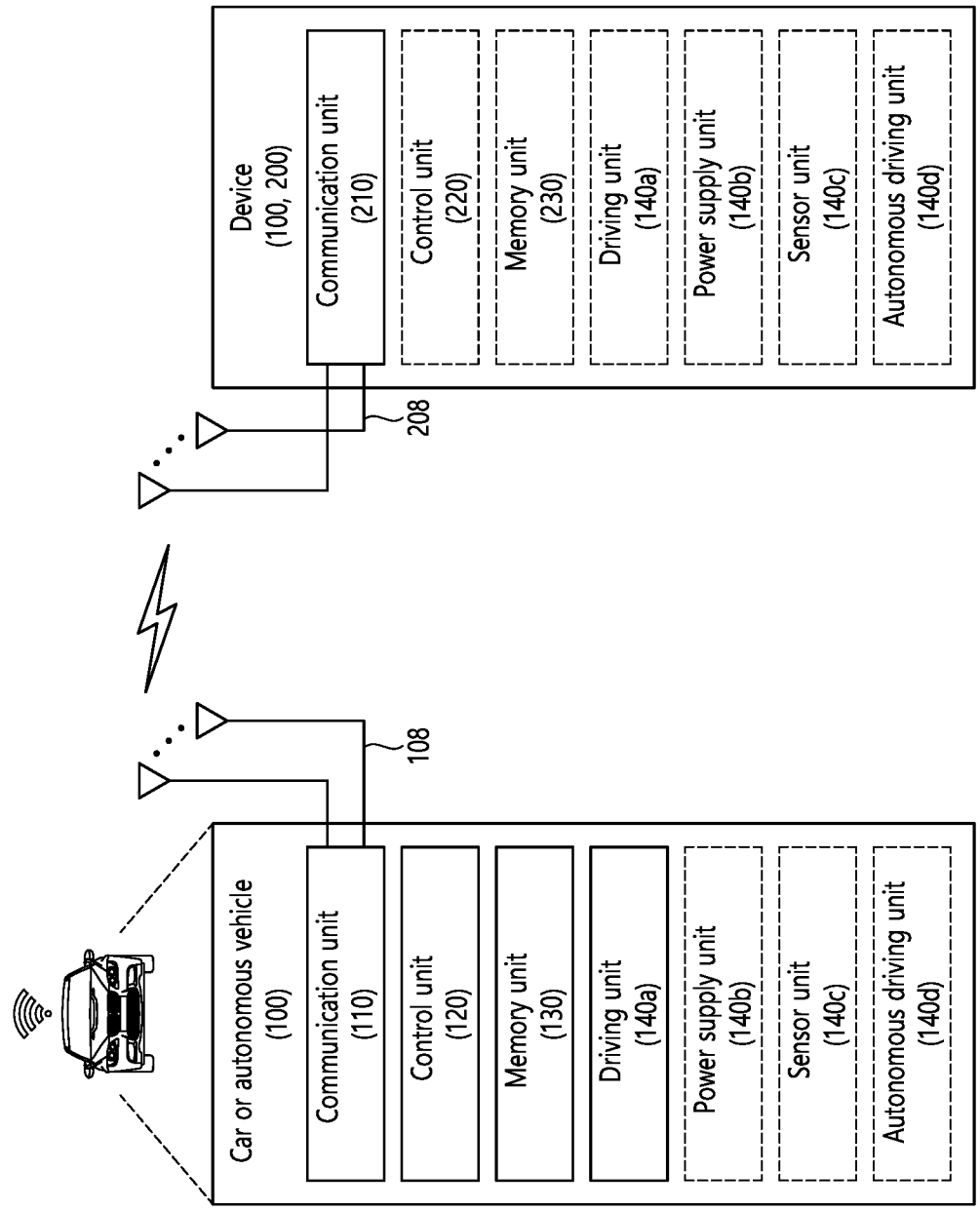

METHOD AND APPARATUS FOR PERFORMING POSITION-BASED SIDELINK COMMUNICATION IN WIRELESS COMMUNICATION SYSTEM

This application is the National Stage filing under 35 U.S.C. 371 of International Application No. PCT/KR2020/002228 filed on Feb. 17, 2020, which claims priority to U.S. Provisional Application Nos. 62/806,723 filed on Feb. 15, 2019 and 62/809,713 filed on Feb. 24, 2019, the contents of which are all hereby incorporated by reference herein in their entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY

In an embodiment, there is provided a method of performing wireless communication by a first apparatus 100. The method may include receiving a sidelink service and at least one ID related to the sidelink service from a second device, determining a communication range related to the second device based on mapping information and the at least one ID related to the sidelink service, and performing sidelink communication with the second device based on the communication range.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 25 shows a car or an autonomous vehicle, in accordance with an embodiment of the present disclosure.

DESCRIPTION OF EXEMPLARY EMBODIMENTS

Figure 1:
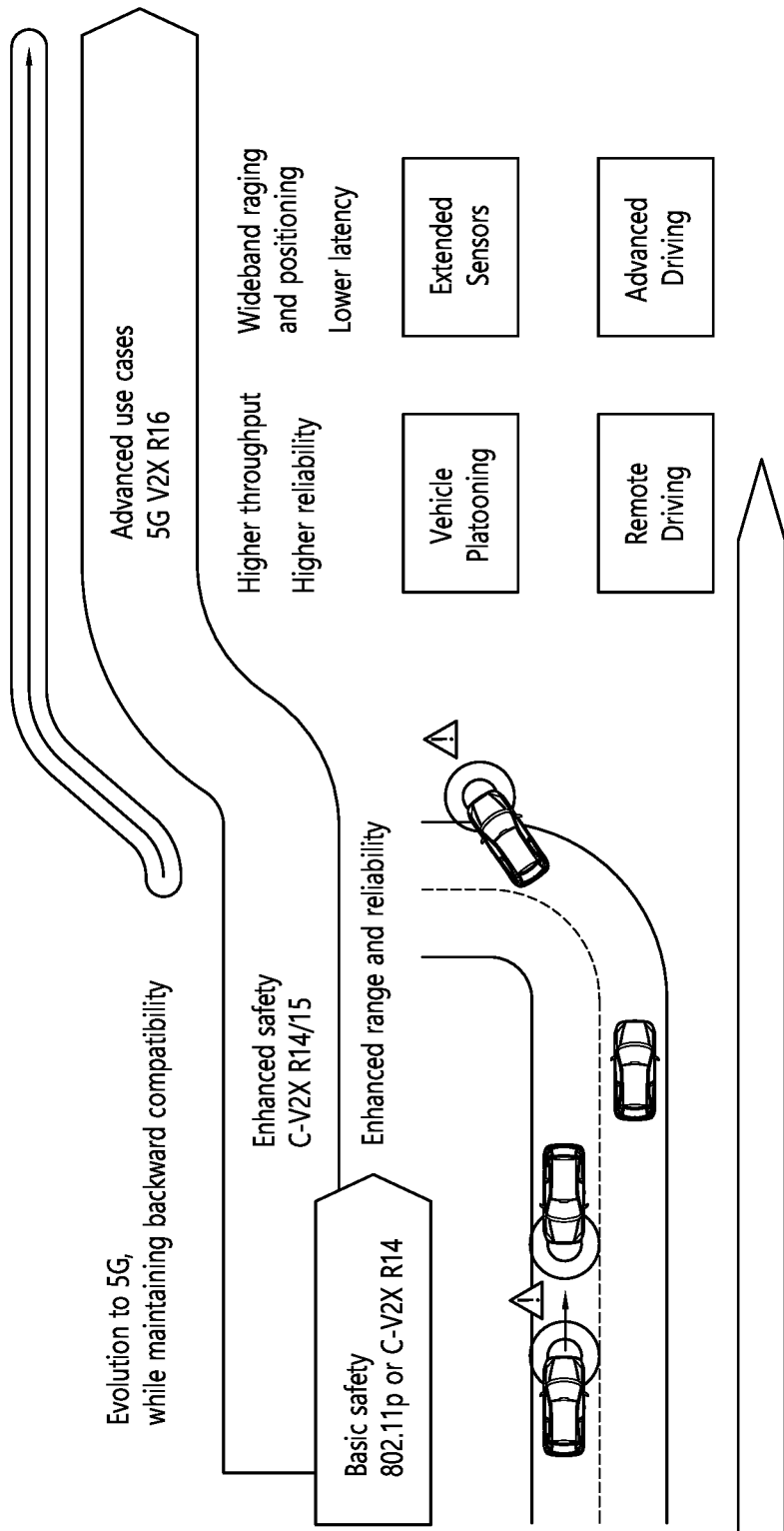
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (01-DMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
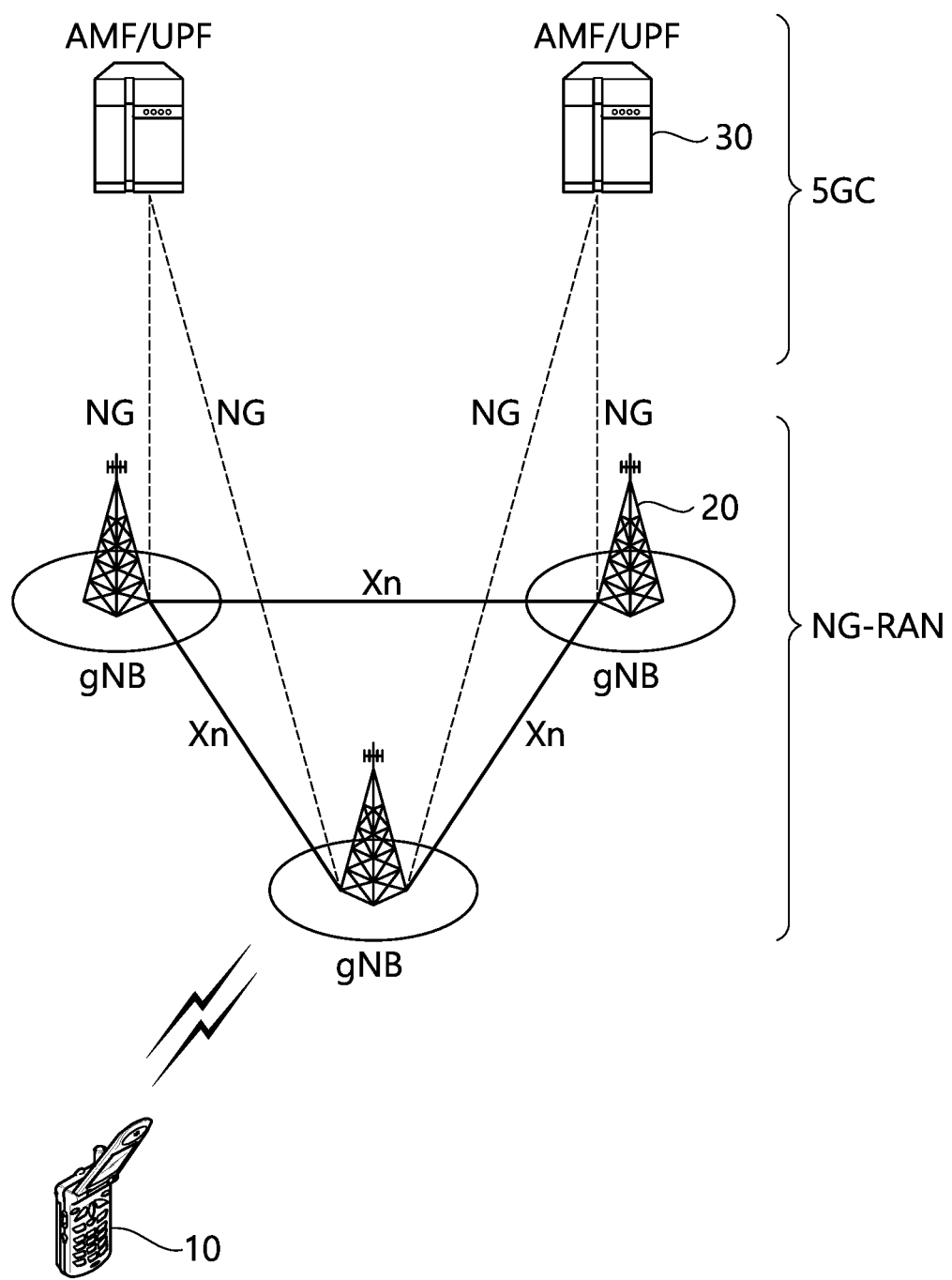
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
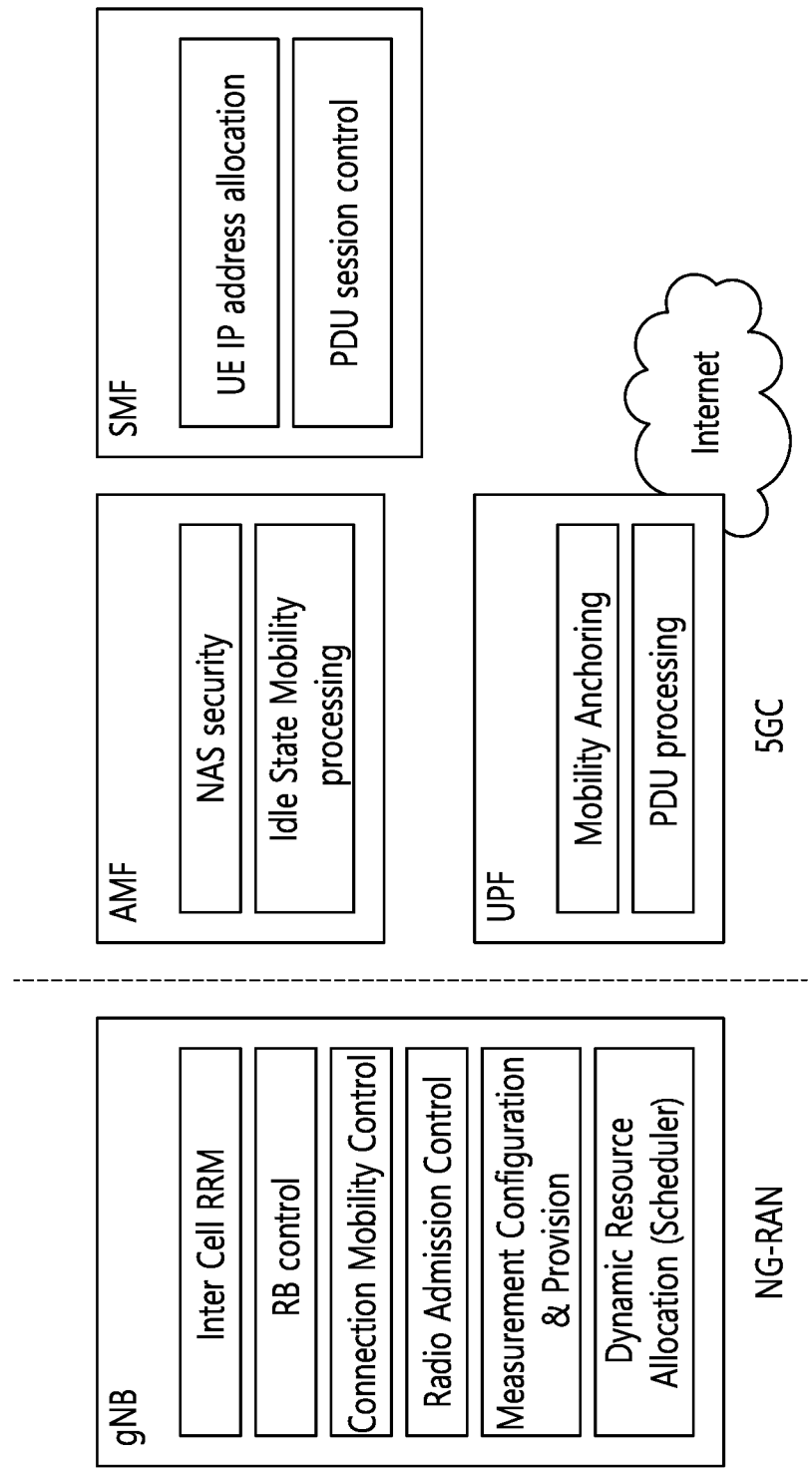
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel A transmission time interval (TTI) is a unit time of subframe transmission.

Figure 5:
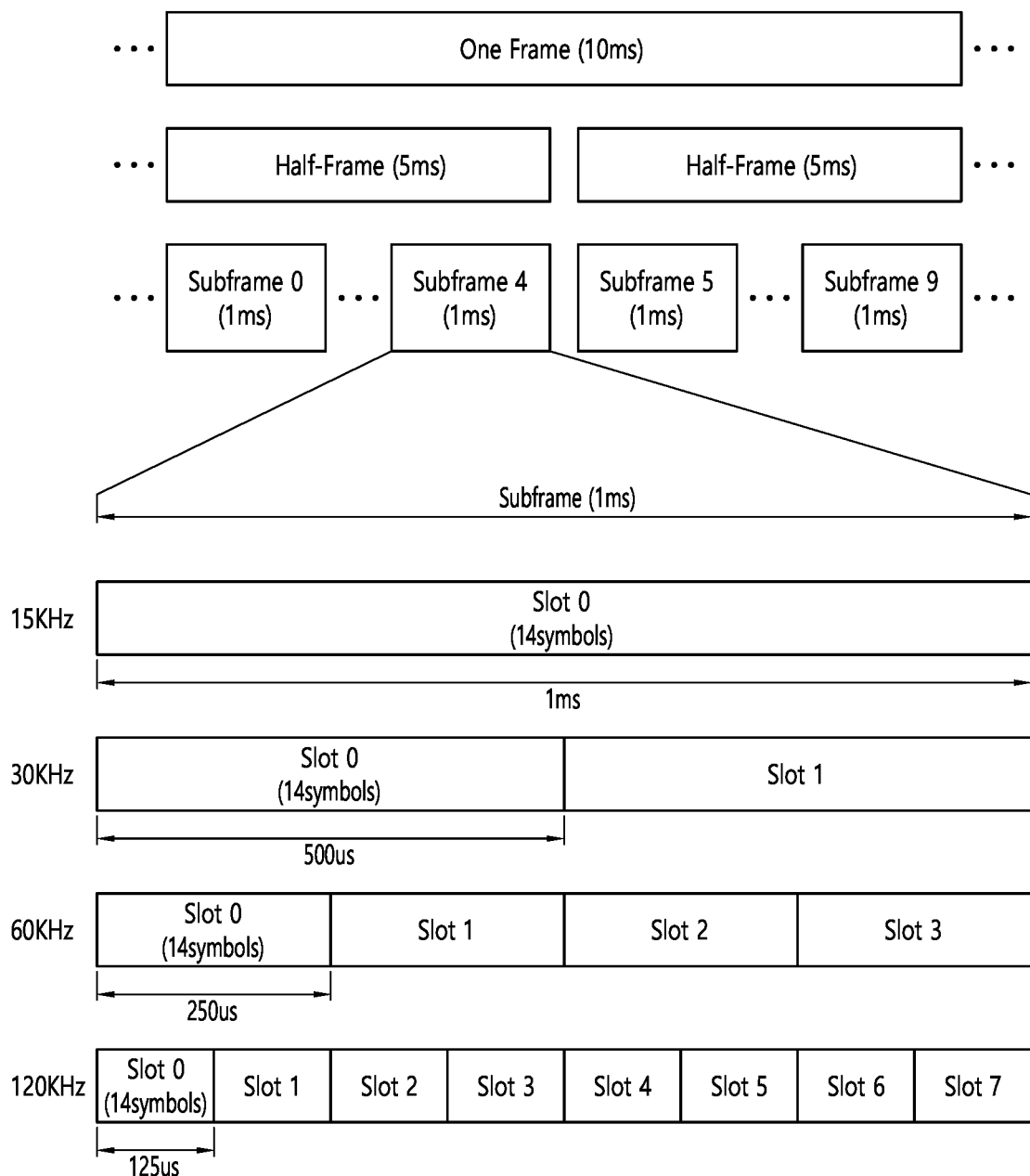
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) in accordance with an SCS configuration (u), in a case where a normal CP is used.

TABLE 1

| SCS (15*2u) | Nslotsymb | Nframe,uslot | Nsubframe,uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2u) | Nslotsymb | Nframe,uslot | Nsubframe,uslot |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
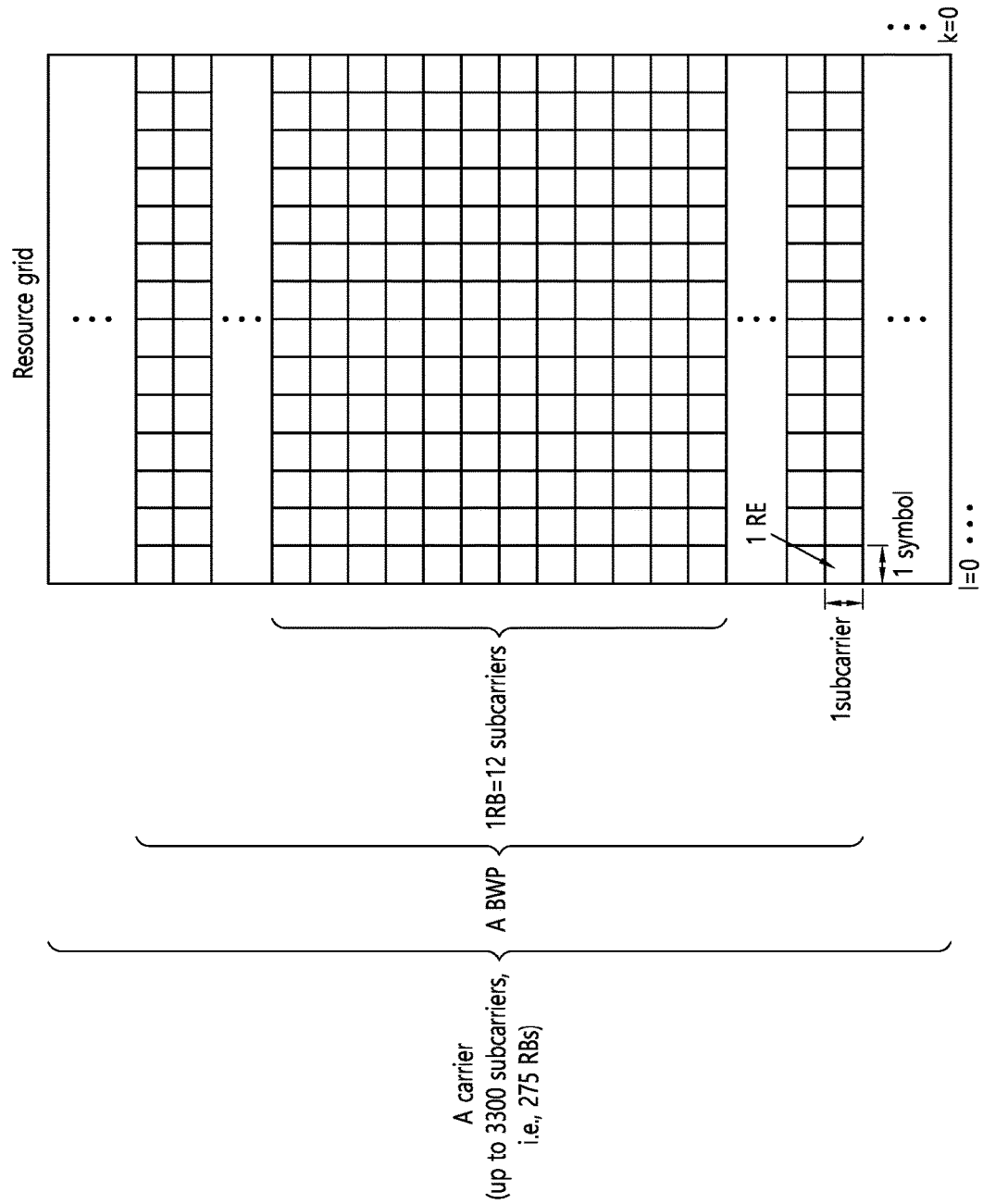
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
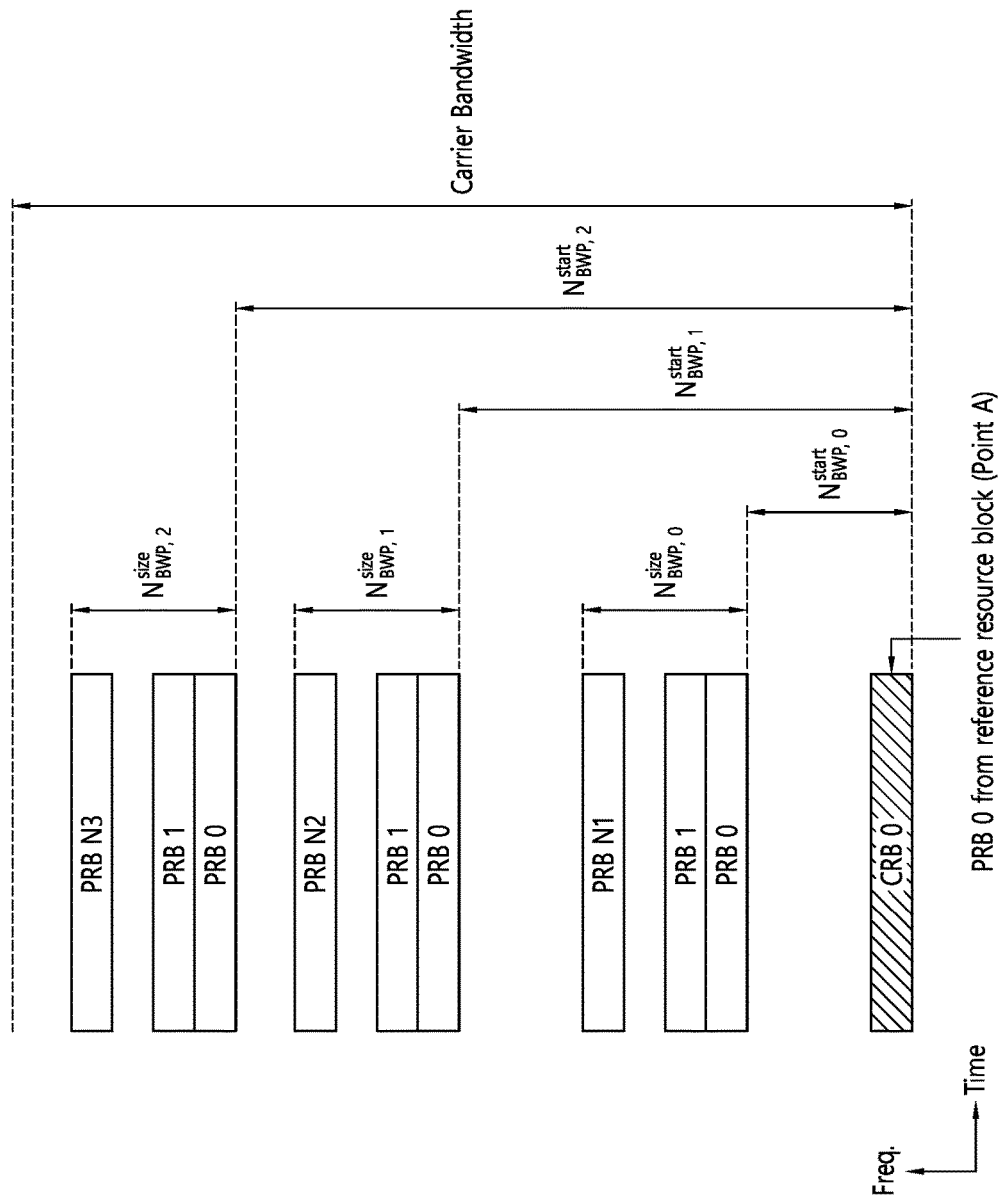
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(*a*) shows a user plane protocol stack, and FIG. 8(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
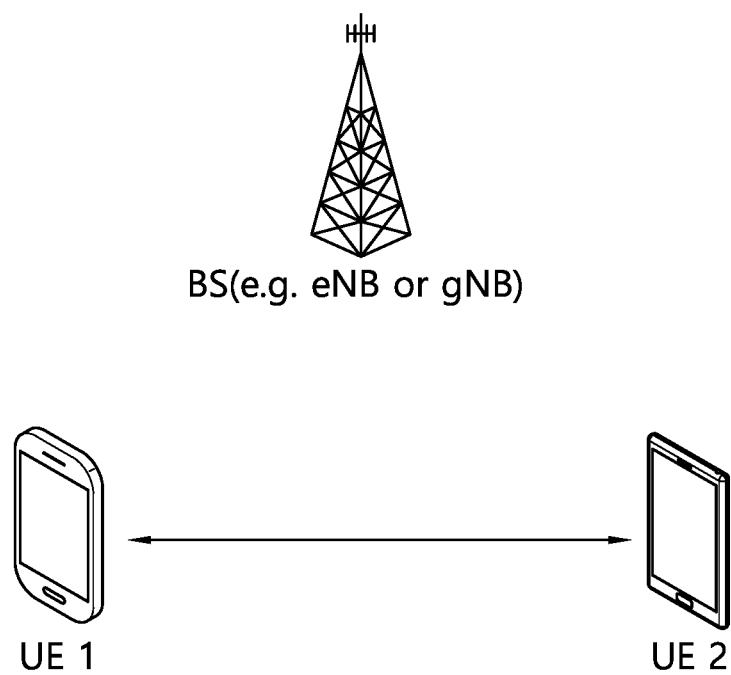
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
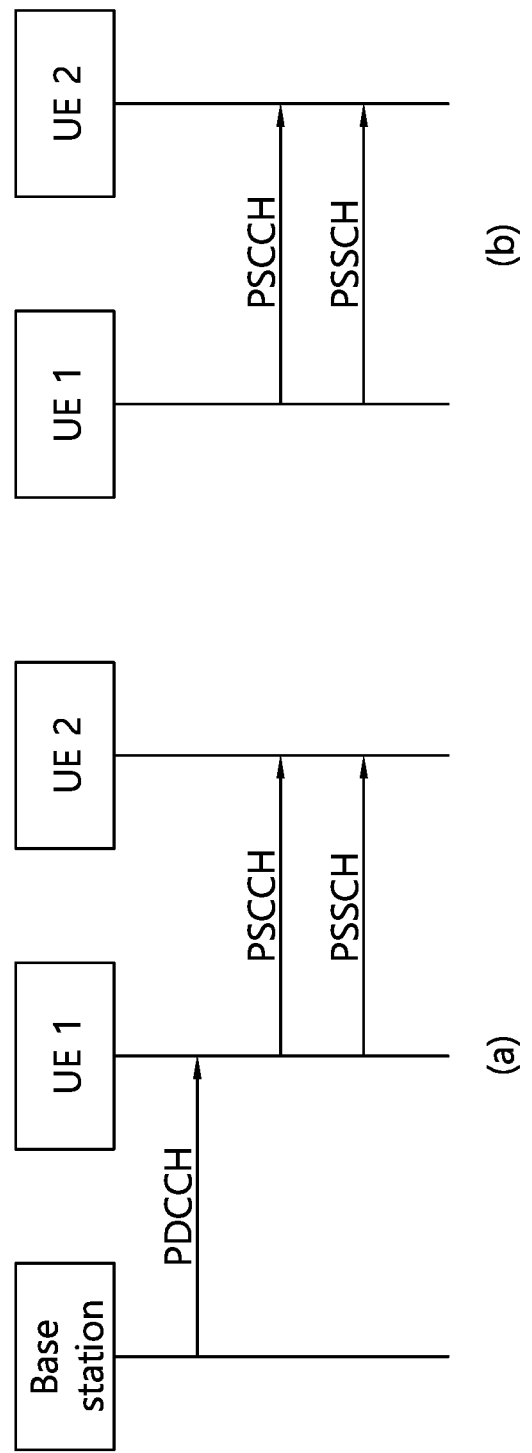
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE lmay perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
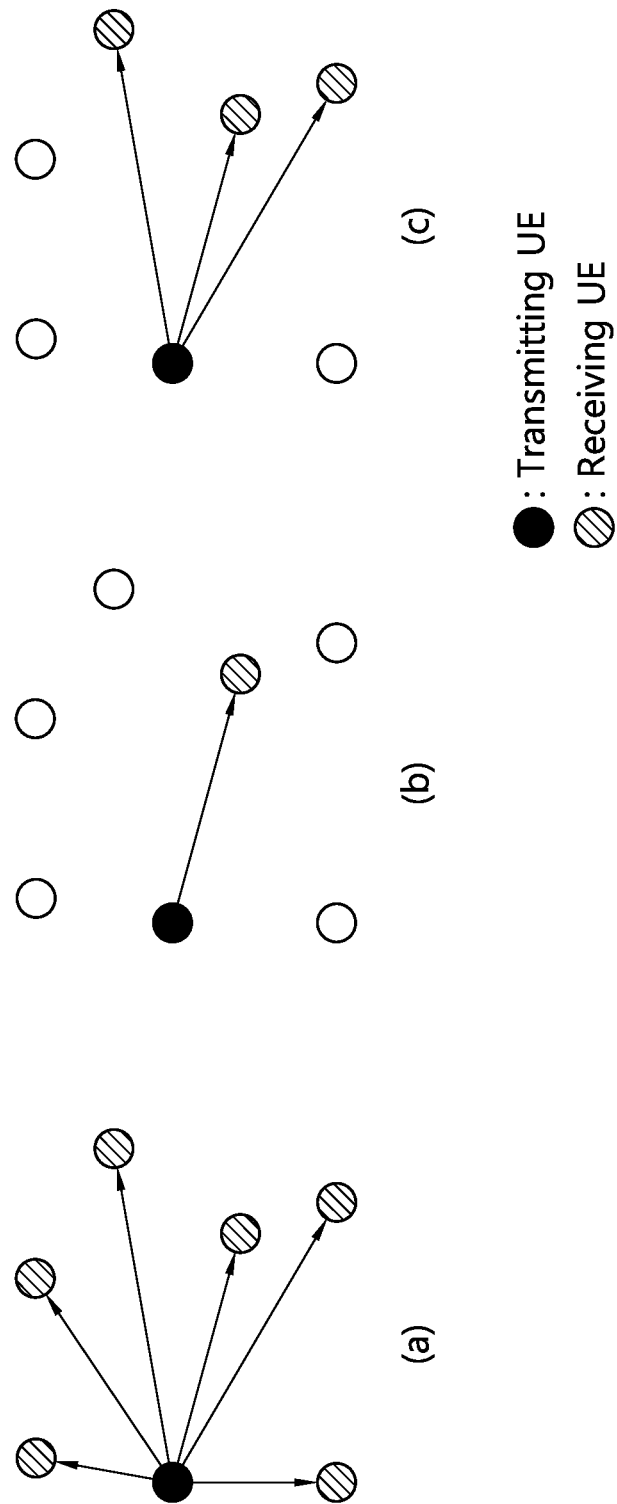
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the next-generation communication system, various use cases may be supported. For example, a service for communication such as an autonomous vehicle, a smart car, or a connected car may be considered. For this service, each vehicle can transmit and receive information as a communication terminal, select resources for communication with or without the base station's help depending on the situation, and send and receive messages between terminals.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes a related PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes a related PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Meanwhile, QoS requirements related to the V2X service may include parameters and/or elements such as priority, reliability, latency, (minimum required) communication range (hereinafter, C_RANGE). For example, when a UE transmitting a certain service (hereinafter, a transmitting UE) transmits a packet related to the certain service, the fact that the certain service has QoS requirements of C_RANGE may mean that the UE located within C_RANGE from the transmitting UE should be able to successfully receive the packet. For example, when a transmitting UE transmits a packet related to a certain service, the fact that the certain service has QoS requirements of C_RANGE may mean that the UE located within C_RANGE from the transmitting UE should be able to successfully receive the packet according to the reliability requirements related to a certain service. For example, when a transmitting UE transmits a packet for a certain service to one or more UEs (hereinafter, receiving UEs), the one or more receiving UEs may need to perform an appropriate operation for the certain service according to whether the one or more receiving UEs are within the C_RANGE of the transmitting UE. Therefore, when groupcast/service communication having a requirement of C_RANGE is performed, the receiving UE may need to efficiently determine whether it is included in the corresponding C_RANGE. This is because the receiving UE must determine whether to transmit the HARQ feedback to the transmitting UE according to whether the receiving UE is within the communication range of the transmitting UE for a certain service. For example, when a receiving UE is within the communication range of a transmitting UE for a certain service, and the receiving UE fails to receive a packet for the certain service, the receiving UE needs to transmit SL HARQ feedback (i.e., NACK) to the transmitting UE. Thereafter, the transmitting UE may re-transmit the packet for the certain service to the receiving UE in response to the NACK, and the receiving UE may re-receive the packet for the certain service. Through the above process, the receiving UE can successfully receive the certain service from the transmitting UE. On the other hand, for example, when the receiving UE is outside the communication range of the transmitting UE for the certain service, even if the receiving UE fails to receive a packet for the certain service, the receiving UE may not need to transmit the SL HARQ feedback (i.e., NACK) to the transmitting UE. Furthermore, in this case, the receiving UE may not unnecessarily perform decoding for the certain service. Therefore, as described above, the receiving UE needs to efficiently determine whether it is within the C_RANGE of the transmitting UE. Hereinafter, according to an embodiment of the present disclosure, for groupcast/service communication with QoS requirements of certain C_RANGE, a method for determining whether a receiving UE is included in a communication range of a transmitting UE will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
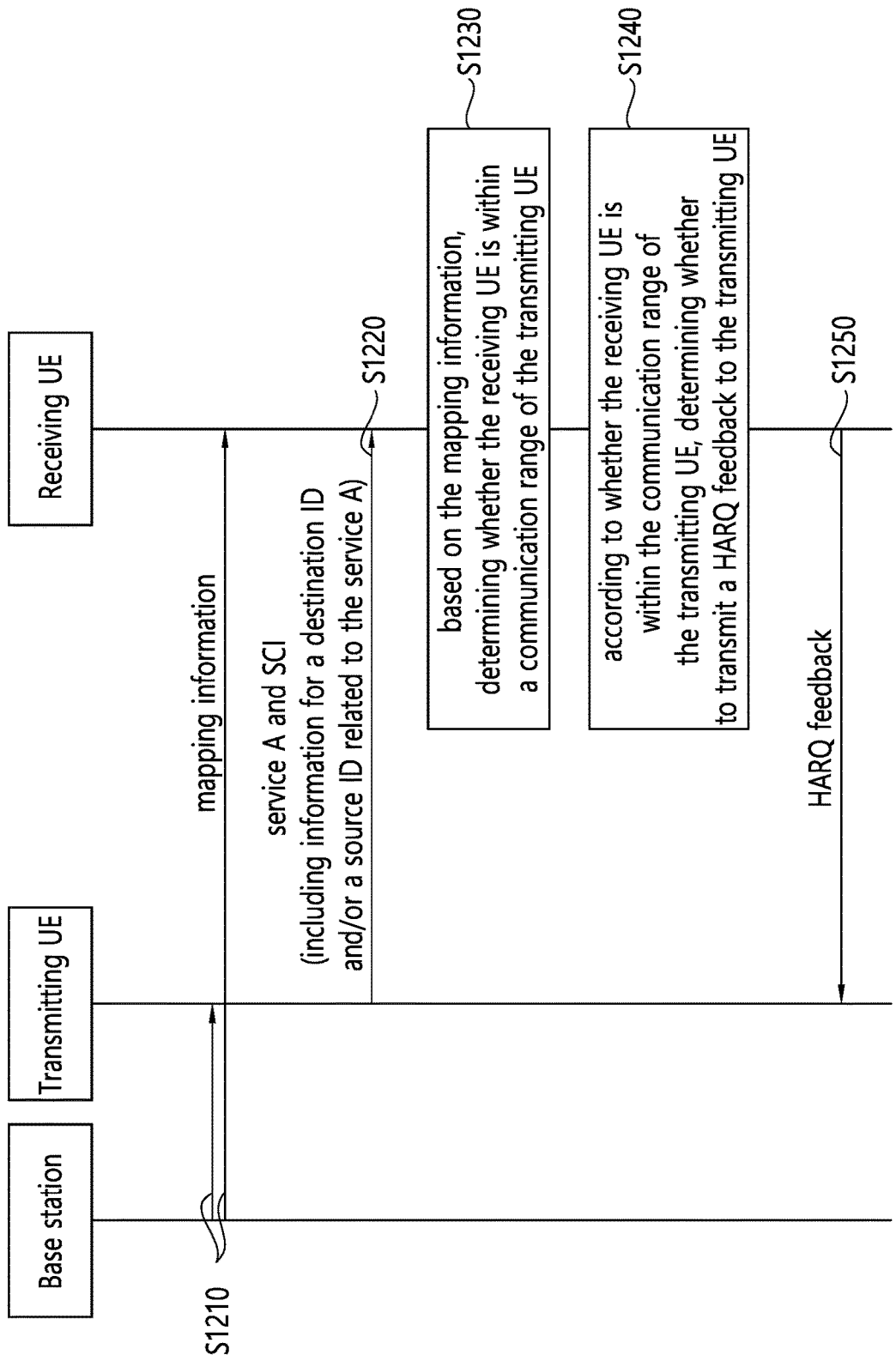
FIG. 12 shows a procedure for determining whether a receiving UE is within a communication range of a transmitting UE for a certain service in accordance with an embodiment of the present disclosure.

FIG. 12 shows a procedure for determining whether a receiving UE is within a communication range of a transmitting UE for a certain service in accordance with an embodiment of the present disclosure.

Referring to FIG. 12, in step S1210, the base station may transmit mapping information to the UE within the coverage. For example, the mapping information may be information for identifying whether the receiving UE is within the range of the transmitting UE. For example, the mapping information may be defined for each service. For example, in the case of a transmitting UE and a receiving UE located within a certain distance, the receiving UE may determine that the service A is not within the range of the transmitting UE based on the mapping information. On the other hand, the receiving UE may determine that the service B is within the range of the transmitting terminal based on the mapping information. For example, the mapping information may be received from the base station when the UE is within the coverage of the base station. For example, the UE may receive the mapping information from the network. Alternatively, for example, the mapping information may be pre-configured to the terminal. For example, the UE outside the coverage of the base station may use the mapping information previously received from the base station or may use pre-configured mapping information.

In step S1220, the transmitting UE may transmit the service A to the receiving UE. For example, when a plurality of UEs exist in a group (i.e., in the case of groupcast sidelink transmission), the transmitting UE may transmit the service A to one or more receiving UEs. For example, when transmitting a packet related to the service A, the transmitting UE may additionally may transmit a destination ID and/or a source ID related to the service A to the receiving UE. For example, the destination ID and/or the source ID related to the service A may be included in the SCI. For example, the destination ID may be a group destination ID. For example, the SCI may be addressed by a PSCCH that a transmitting UE transmits to a receiving UE. For example, the transmitting UE may transmit the service A, the destination ID, and/or the source ID to the receiving UE through L1 signaling, L2 signaling, or L3 signaling.

In step S1230, based on the mapping information and the ID, the receiving UE may determine whether the transmitting UE is within a communication range of the receiving UE for the service A. For example, location information and/or communication range information of the transmitting UE may be used to determine whether the receiving UE is within a communication range of the transmitting UE for a certain service. For example, location/area information of the receiving UE may be used to determine whether the receiving UE is within a communication range of the transmitting UE for a certain service. For example, some bits of a destination ID may be used to determine whether the receiving UE is within the communication range of the transmitting UE. For example, the some bits may be a Most Significant Bit (MSB) or a Least Significant Bit (LSB) of the destination ID. For example, the some bits may be certain bits other than the MSB or LSB of the destination ID. For example, some bits of a source ID may be used to determine whether the receiving UE is within the communication range of the transmitting UE. For example, the some bits may be MSB or LSB of the source ID. For example, the some bits may be certain bits other than the MSB or LSB of the source ID.

In step S1240, according to whether the receiving UE is within the communication range of the transmitting UE for the service A, the receiving UE may determine whether to transmit a HARQ feedback to the transmitting UE. For example, when the receiving UE is within the communication range of the transmitting UE for the service A, if the receiving UE fails to receive the service A, in step S1250, the receiving UE may transmit a SL HARQ feedback (i.e., NACK) to the transmitting UE. For example, some bits of the destination ID and/or the source ID may trigger the SL HARQ feedback of the receiving UE. Thereafter, the receiving UE may re-receive the service A from the transmitting UE. On the other hand, for example, when the receiving UE is outside the communication range of the transmitting UE for service A, even if the receiving UE fails to receive the service A, the receiving UE may not transmit a SL HARQ feedback (i.e., NACK) to the transmitting UE. Furthermore, for example, the receiving UE may not unnecessarily perform decoding for service A.

Figure 13:
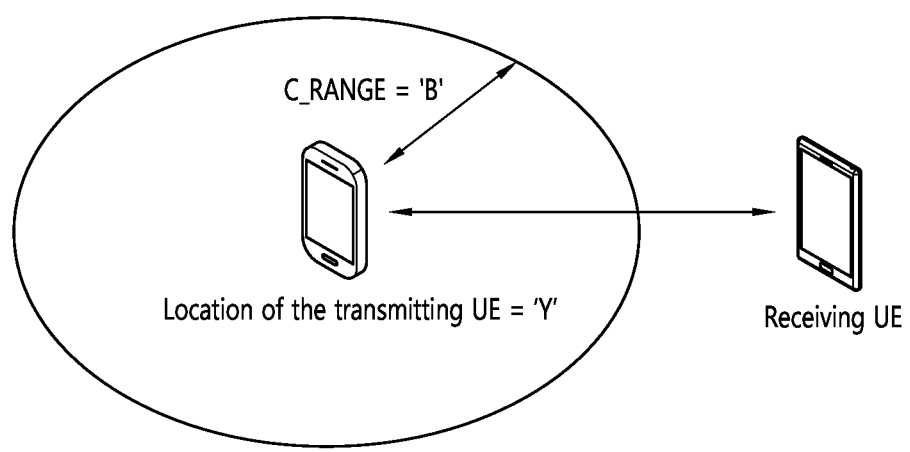
FIG. 13 shows an example of determining whether a receiving UE is within a communication range of transmitting UE for a certain service based on a destination ID in accordance with an embodiment of the present disclosure.
Figure 14:
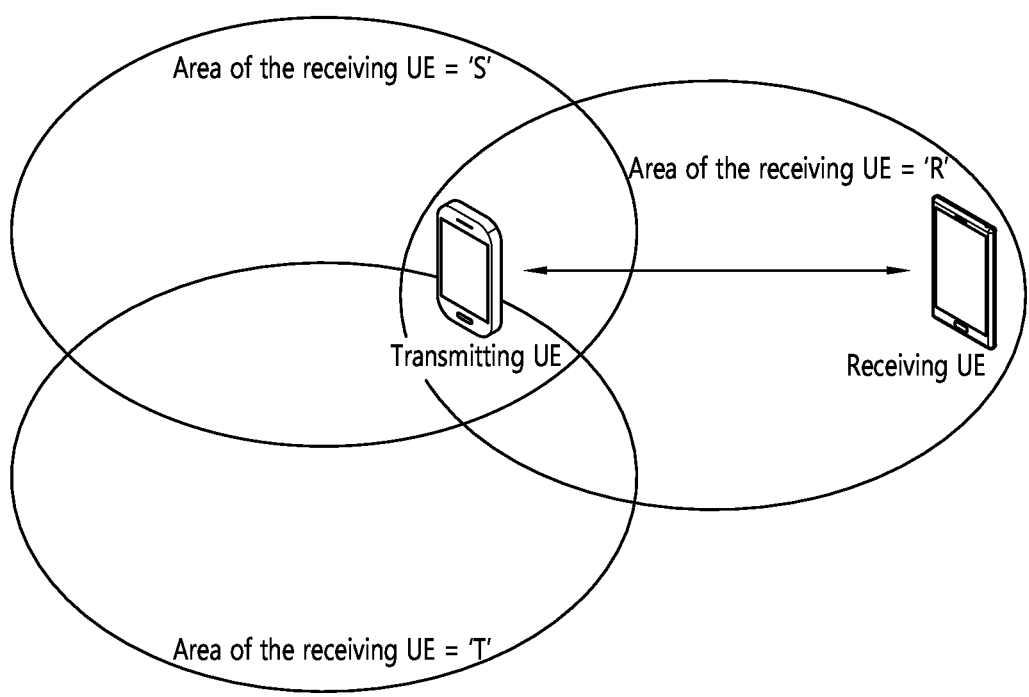
FIG. 14 shows an example of determining whether a receiving UE is within a communication range of transmitting UE for a certain service based on a source ID in accordance with an embodiment of the present disclosure.

FIG. 13 shows an example of determining whether a receiving UE is within a communication range of transmitting UE for a certain service based on a destination ID in accordance with an embodiment of the present disclosure. FIG. 14 shows an example of determining whether a receiving UE is within a communication range of transmitting UE for a certain service based on a source ID in accordance with an embodiment of the present disclosure.

Step S1230 described above will be described in more detail with reference to FIGS. 13 and 14.

In step S1230, based on the mapping information and the ID, the receiving UE may determine whether the transmitting UE is within a communication range of the receiving UE for a certain service. For example, some bits of the destination ID and/or the source ID may be used to determine whether the receiving UE is within the communication range of the transmitting UE. For example, some bits of the destination ID and/or the source ID may signal two types of information. For example, as first type information, some bits of the destination ID and/or the source ID may signal location information and C_RANGE of the transmitting UE (e.g., a UE corresponding to the source ID). For example, as second type information, some bits of the destination ID and/or the source ID my signal location/area information of the receiving UE (e.g., location/area information of the receiving UE to which the packet is received).

For example, if some bits 'X+Y+Z' of the destination ID and/or the source ID are used, the 'X' bit of the ID may inform the receiving UE whether the ID should be interpreted for the 'application ID' purpose or the 'location ID' purpose. For example, when the 'X' bit indicates the purpose of the 'location ID', the 'Y' bit of the ID may indicate the first type information or the second type information. For example, the 'Y' bit may follow the 'X' bit. For example, the 7 bit of the ID may be an identifier for distinguishing a plurality of receiving UEs belonging to a target area. For example, the 7 bit may follow the 'Y' bit. For example, when the 'X' bit indicates the purpose of the 'application ID', all bits of the ID may indicate the application ID.

Table 5 below shows an example of mapping information related to a certain service A. Table 5 shows an example of the first type information. As described above, for example, the mapping information may be defined differently for each service.

TABLE 5

| Some bits | Location range of the transmitting UE | C_RANGE |
|---|---|---|
| 00 | X | A |
| 01 | Y | B |
| 10 | X | C |
| 11 | Y | D |

For example, with respect to the certain service A that the transmitting UE intends to transmit, it is assumed that some bits of the destination ID are '01'. Referring to Table 5 and FIG. 13, the receiving UE receiving the destination ID including '01' from the transmitting UE may identify that the transmitting UE is currently within the range of 'Y', and the receiving UE may identify that the communication range related to the certain service A is 'B'. Since the receiving UE may determine its current location, the receiving UE may determine that it is outside the communication range of the transmitting UE for the certain service A. Table 6 below shows an example of mapping information related to a certain service A. Table 6 shows an example of the second type information. As described above, for example, the mapping information may be defined differently for each service. For example, the mapping information may include information on a service type.

TABLE 6

| Some bits | Location/area information of receiving UE |
|---|---|
| 00 | R |
| 01 | S |
| 10 | T |

Figure 15:
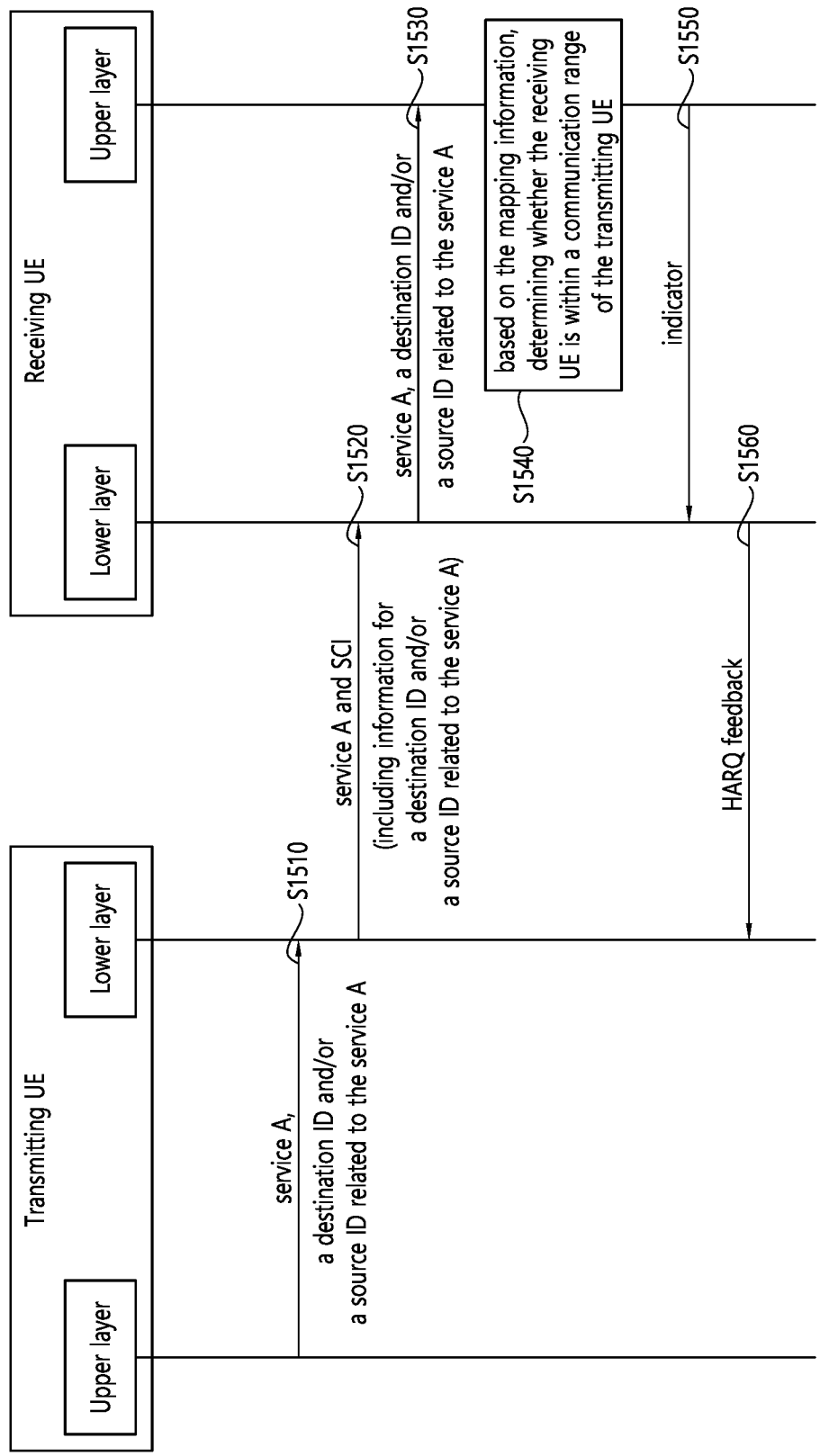
FIG. 15 shows a procedure for determining whether a receiving UE is within a communication range of a transmitting UE for a certain service in accordance with an embodiment of the present disclosure.

For example, with respect to the certain service A that the transmitting UE intends to transmit, it is assumed that some bits of the source ID are '00'. Referring to Table 6 and FIG. 14, the receiving UE receiving the source ID including '00' from the transmitting UE may identify that the location/area of the receiving UE to which the transmitting UE intends to transmit a packet is 'R'. Since the receiving UE may determine its current location/area, the receiving UE may determine that it is within the communication range of the transmitting UE for the certain service A. FIG. 15 shows a procedure for determining whether a receiving UE is within a communication range of a transmitting UE for a certain service in accordance with an embodiment of the present disclosure.

In this specification, the upper layer may include a V2X layer and/or an application layer, and the lower layer may include an AS layer (e.g., an RRC layer, a PDCP layer, an RLC layer, a MAC layer and/or a physical (hereinafter, PHY) layer).

Referring to FIG. 15, in step S1510, an upper layer (e.g., an application layer) of the transmitting UE may provide information for a destination ID and/or a source ID related to a service A as well as a packet related to the service A to a lower layer. For example, the destination ID and/or the source ID may be differently determined for each service.

In step S1520, the transmitting UE may transmit the packet related to the service A to the receiving UE. Additionally, for example, the lower layer (e.g., PHY layer) of the transmitting UE may transmit a SCI including the ID information through the PSCCH or PSSCH (e.g., 2nd SCI form). In this case, for example, the service packet/message related to the ID information may be transmitted together through the PSSCH or the SL-SCH. For example, the transmitting UE may transmit the service packet/message related to the ID information together through the PSCCH or the PSSCH scheduled by the 2nd SCI. For example, as described in FIG. 12, some bits of the ID may be mapped with location information and/or communication range information of the transmitting UE. For example, as described in FIG. 12, some bits of the ID may be mapped with location/area information of the receiving UE (e.g., location/area information of the receiving UE that is a target of packet reception).

In the embodiment of FIG. 15, for example, it is assumed that the upper layer can interpret some bits, while the lower layer cannot interpret some bits. That is, the upper layer may have mapping information. For example, when the UE is within the coverage of the base station, the UE may receive the mapping information from the base station. Alternatively, the mapping information may be pre-configured in the UE. Accordingly, in step S1530, the lower layer of the receiving UE may transmit information for the destination ID and/or the source ID related to the service A to the upper layer of the receiving UE.

In step S1540, based on the mapping information and the ID, the upper layer of the receiving UE may determine whether the receiving UE is within the communication range of the transmitting UE for the service A. For example, in order for the receiving UE to determine whether the receiving UE is within the communication range of the transmitting UE for a certain service, location information and/or communication range information of the transmitting UE may be used. For example, in order for the receiving UE to determine whether the receiving UE is within the communication range of the transmitting UE for a certain service, location/area information of the receiving UE (e.g., location/area information of the receiving UE that is the target of packet reception) may be used. For example, as described in step S1230 of FIG. 12, the upper layer of the receiving UE may determine whether the receiving UE is within the communication range of the transmitting UE for a certain service.

It is assumed that the upper layer of the receiving UE has determined that the receiving UE is within the communication range of the transmitting UE for the service A. Thereafter, in step S1550, the upper layer of the receiving UE may provide a specific indicator or specific information to the lower layer of the receiving UE. For example, the specific indicator or specific information may be an indicator or information for triggering a specific operation (e.g., SL HARQ feedback) to the lower layer. For example, if the receiving UE that has received the indicator or information from the upper layer determines that the reception of the service A has failed, in step S1560, the receiving UE may transmit HARQ feedback (i.e., NACK) to the transmitting UE. That is, some bits of the destination ID and/or the source ID may trigger the SL HARQ feedback of the receiving UE. Then, for example, the receiving UE may re-receive the service A from the transmitting UE.

Alternatively, it is assumed that the upper layer of the receiving UE has determined that the receiving UE is outside the communication range of the transmitting UE for the service A. In this case, the upper layer of the receiving UE may not provide a specific indicator or specific information to the lower layer, and the lower layer of the receiving UE may not decode the service A. For example, if the lower layer of the receiving UE has not received any indicator or information from the upper layer of the receiving UE for a pre-determined time after step S1530, the lower layer of the receiving UE may not decode the service A.

Figure 16:
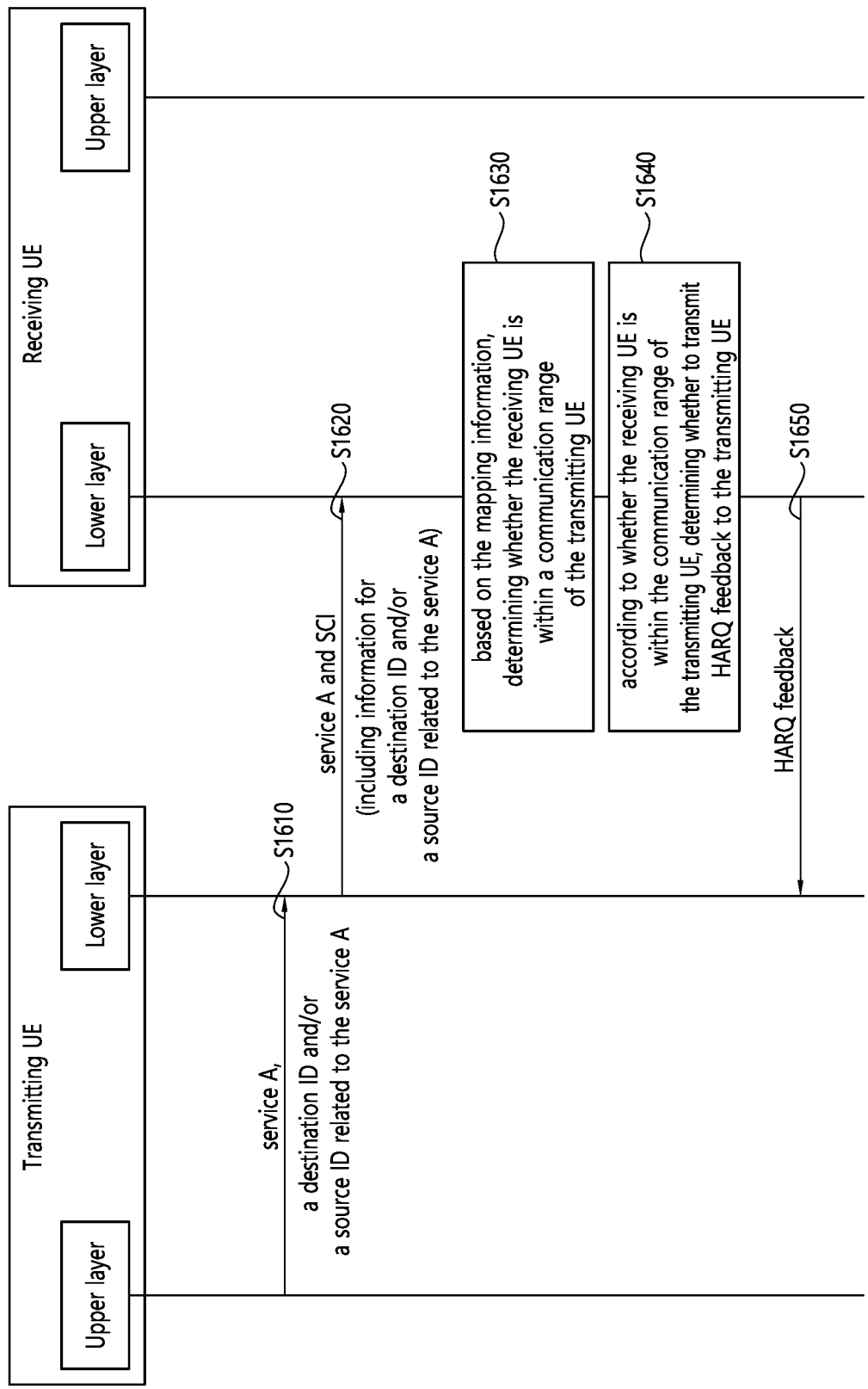
FIG. 16 shows a detailed procedure for determining whether a receiving UE is within a communication range of a transmitting UE for a certain service in accordance with an embodiment of the present disclosure.

FIG. 16 shows a detailed procedure for determining whether a receiving UE is within a communication range of a transmitting UE for a certain service in accordance with an embodiment of the present disclosure.

Referring to FIG. 16, in step S1610, an upper layer (e.g., an application layer) of the transmitting UE may provide information for a destination ID and/or a source ID related to a service A as well as a packet related to the service A to a lower layer of the transmitting UE. For example, the destination ID and/or the source ID may be differently determined for each service.

In step S1620, the transmitting UE may transmit the packet related to the service A to the receiving UE. Additionally, for example, the lower layer (e.g., PHY layer) of the transmitting UE may transmit a SCI including the ID information through the PSCCH or PSSCH (e.g., 2nd SCI form). In this case, for example, the service packet/message related to the ID information may be transmitted together through the PSSCH or the SL-SCH. For example, the transmitting UE may transmit the service packet/message related to the ID information together through the PSCCH or the PSSCH scheduled by the 2nd SCI. For example, as described in FIG. 12, some bits of the ID may be mapped with location information and/or communication range information of the transmitting UE. For example, as described in FIG. 12, some bits of the ID may be mapped with location/area information of the receiving UE (e.g., location/area information of the receiving UE that is a target of packet reception).

In the embodiment of FIG. 16, for example, it is assumed that the lower layer can interpret some bits. That is, it is assumed that the upper layer provides the mapping information to the lower layer. For example, when the UE is within the coverage of the base station, the UE may receive the mapping information from the base station. Alternatively, the mapping information may be pre-configured in the UE.

In step S1630, based on the mapping information and the ID, the lower layer of the receiving UE may determine whether the receiving UE is within the communication range of the transmitting UE for the service A. For example, in order for the receiving UE to determine whether the receiving UE is within the communication range of the transmitting UE for a certain service, location information and/or communication range information of the transmitting UE may be used. For example, in order for the receiving UE to determine whether the receiving UE is within the communication range of the transmitting UE for a certain service, location/area information of the receiving UE (e.g., location/area information of the receiving UE that is the target of packet reception) may be used. For example, as described in step S1230 of FIG. 12, the lower layer of the receiving UE may determine whether the receiving UE is within the communication range of the transmitting UE for a certain service.

In step S1640, the receiving UE may determine whether to transmit a HARQ feedback to the transmitting UE according to whether the receiving UE is within the communication range of the transmitting UE for the service A. For example, when the receiving UE is within the communication range of the transmitting UE for the service A, if the receiving UE fails to receive the service A, in step S1650, the receiving UE may transmit an SL HARQ feedback (i.e., NACK) to the transmitting UE. That is, some bits of the destination ID and/or the source ID may trigger the SL HARQ feedback of the receiving UE. Then, for example, the receiving UE may re-receive the service A from the transmitting UE.

On the other hand, for example, when the receiving UE is out of the communication range of the transmitting UE for the service A, even if the receiving UE fails to receive the service A, the receiving UE may not transmit the SL HARQ feedback (i.e., NACK) to the transmitting UE. Furthermore, in this case, the receiving UE may not unnecessarily perform decoding for the service A.

According to an embodiment of the present disclosure, with respect to a certain service, the receiving UE can efficiently determine whether it is within the communication range of the transmitting UE. Furthermore, according to an embodiment of the present disclosure, some bits of the destination ID and/or source ID transmitted by the transmitting UE may trigger SL HARQ feedback of the receiving UE. That is, for example, the receiving UE can efficiently determine whether it is within the communication range of the transmitting UE based on the destination ID and/or the source ID transmitted by the transmitting UE, and may quickly transmit the HARQ feedback to the transmitting UE. Furthermore, even though the receiving UE is outside the communication range of the transmitting UE for the certain service, unnecessary operations such as unnecessarily performing decoding for the certain service by the receiving UE may be prevented.

Figure 17:
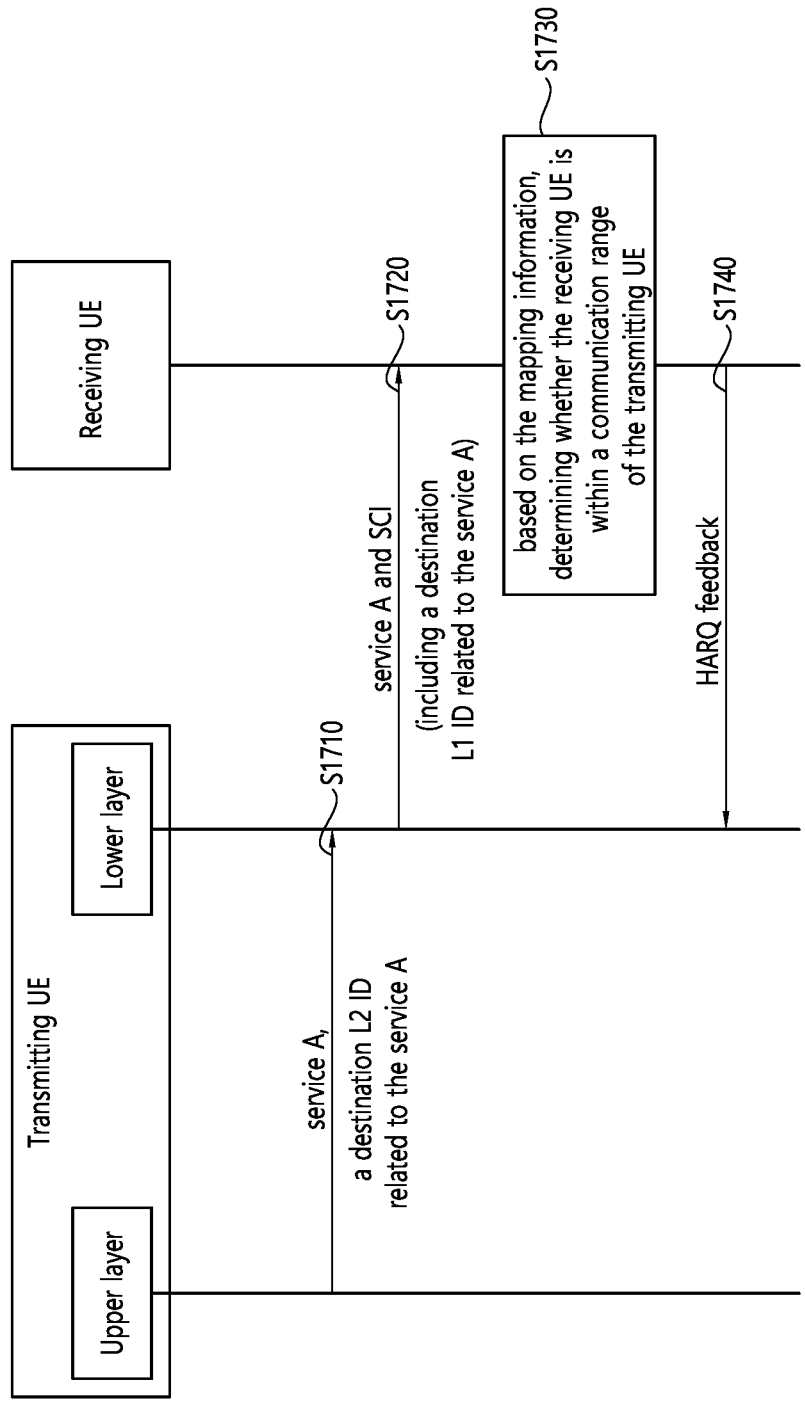
FIG. 17 shows a detailed procedure for determining whether a receiving UE is within a communication range of a transmitting UE for a certain service in accordance with an embodiment of the present disclosure.

FIG. 17 shows a detailed procedure for determining whether a receiving UE is within a communication range of a transmitting UE for a certain service in accordance with an embodiment of the present disclosure.

In the case of dynamic group communication or connection-less groupcast, the V2X layer may not receive group information from the application layer. For example, the group information may be information related to group communication transmission and/or group communication reception. In the above case, for example, the V2X layer may use a pre-defined default mapping. For example, the V2X layer may derive a destination layer 2 (L2) ID, QoS parameters (e.g., VQI (V2X 5QI)), range etc. based on the PSID (provider service identifier)/ITS-ADI (ITS application identifier) mapping. Thereafter, the V2X layer may deliver information derived from the default mapping to the AS layer. For example, the V2X layer may deliver information related to the group communication transmission and/or reception derived from the default mapping to the AS layer.

Referring to FIG. 17, in step S1710, the upper layer of the transmitting UE may deliver information for the destination ID related to a service A as well as the service A to the lower layer of the transmitting UE. For example, the V2X layer of the transmitting UE may deliver the destination L2 ID related to the service A as well as the service A to the AS layer of the transmitting UE.

The AS layer of the transmitting UE may hash or include location information and/or communication range information (that is, the minimum required communication range) of the transmitting UE in the destination L2 ID delivered from the V2X layer. For example, the communication range information may be range information of a dynamic group communication packet. For example, the AS layer of the transmitting UE may hash or include location/area information of the receiving UE (e.g., location/area information of the receiving UE that is the target of packet reception) to the destination L2 ID delivered from the V2X layer. For example, the AS layer of the transmission UE may hash or include location information and/or communication range information of the transmission UE in some bits of the destination L2 ID delivered from the V2X layer. For example, the AS layer of the transmitting UE may hash or include location/area information of the receiving UE in some bits of the destination L2 ID delivered from the V2X layer. For example, the some bits may be determined based on a pre-defined rule/function. For example, after performing the above process, the AS layer of the transmitting UE may change the destination L2 ID to a destination L1 ID according to a pre-defined rule/function, and the destination L1 ID may be included in a pre-defined field (e.g., DS L1 ID field) on the SCI.

Alternatively, the AS layer of the transmitting UE may change the destination L2 ID to the destination L1 ID according to a pre-defined rule/function. In this case, for example, the destination L2 ID may not include location information of the transmitting UE, communication range information of the transmitting UE and/or location/area information of the receiving UE. For example, after the AS layer of the transmitting UE changes the destination L2 ID to the destination L1 ID, the AS layer of the transmitting UE may hash or include the location information and/or communication range information of the transmitting UE in the destination L1 ID. For example, after the AS layer of the transmitting UE changes the destination L2 ID to the destination L1 ID, the AS layer of the transmitting UE may hash or include the location/area information of the receiving UE in the destination L1 ID. For example, after the AS layer of the transmitting UE changes the destination L2 ID to the destination L1 ID, the AS layer of the transmitting UE may hash or include the location information and/or communication range information of the transmitting UE in some bits of the destination L1 ID. For example, after the AS layer of the transmitting UE changes the destination L2 ID to the destination L1 ID, the AS layer of the transmitting UE may hash or include the location/area information of the receiving UE in some bits of the destination L1 ID. For example, the some bits may be determined based on a pre-defined rule/function.

Alternatively, the AS layer of the transmitting UE may include communication range information and/or QoS parameter information related to the dynamic group communication packet in a pre-defined field (e.g., a QR field) on the SCI. For example, the AS layer of the transmitting UE may include the location information and/or communication range information of the transmitting UE in the QR field. For example, the AS layer of the transmitting UE may include the location/area information of the receiving UE in the QR field.

In step S1720, the transmitting UE may transmit the service A to the receiving UE. Additionally, for example, the transmitting UE may transmit to the receiving UE not only the packet related to the service A, but also the SCI including the location information and/or communication range information of the transmitting UE. For example, the transmitting UE may transmit the SCI including the location/area information of the receiving UE to the receiving terminal. For example, the AS layer of the receiving UE may perform decoding on the DS L1 ID field and/or the QR field on the SCI. For example, the DS L1 ID field and/or the QR field may be mapped with the location information and/or communication range information of the transmitting UE. Alternatively, for example, the DS L1 ID field and/or the QR field may be mapped with the location/area information of the receiving UE (e.g., location/area information of the receiving UE that is a target of packet reception).

In step S1730, the receiving UE may determine whether the receiving UE is within a communication range of the transmitting UE for the service A based on the mapping information and the SCI. For example, the receiving UE may determine the location information and/or communication range information of the transmitting UE based on the decoding result of the DS L1 ID field and/or the QR field on the SCI. For example, the receiving UE may determine the location/area information of the receiving UE based on the decoding result of the DS L1 ID field and/or the QR field on the SCI. Through this, the receiving UE may determine whether the receiving UE is within the communication range of the transmitting UE for a certain service. In the above description, alternatively, the SCI may be described by extending it to a PSSCH. According to an embodiment, based on the decoding result of the DS L1 ID field and/or the QR field on the PSSCH, the receiving UE may determine the location information and/or communication range information of the transmitting UE. For example, the receiving UE receives sidelink information from the transmitting UE through the PSSCH, and based on the decoding result for the DS L1 ID field and/or the QR field on the PSSCH, the receiving UE may determine the location information and/or communication range information of the transmitting UE. According to an embodiment, based on the decoding result of the DS L1 ID field and/or the QR field on the PSSCH, the receiving UE may determine the location/area information of the receiving UE. For example, the receiving UE receives sidelink information from the transmitting UE through the PSSCH, and based on the decoding result for the DS L1 ID field and/or the QR field on the PSSCH, the receiving UE may determine the location/area information of the receiving UE.

In step S1740, the receiving UE may determine whether to transmit the HARQ feedback to the transmitting UE according to whether the receiving UE is within the communication range of the transmitting UE for the service A. For example, when the receiving UE is within the communication range of the transmitting UE for the service A, if the receiving UE fails to receive the service A, in step S1740, the receiving UE may transmit SL HARQ feedback (i.e., NACK) to the transmitting UE. Then, for example, the receiving UE may re-receive the service A from the transmitting UE. For example, if the receiving UE succeeds in receiving the service A, the receiving UE may not transmit SL HARQ feedback (i.e., ACK). On the other hand, for example, when the receiving UE is outside the communication range of the transmitting UE for the service A, even if the receiving UE fails to receive service A, the receiving UE may not transmit SL HARQ feedback (i.e., NACK) to the transmitting UE. In this case, for example, the receiving UE may not unnecessarily perform decoding for the service A.

Alternatively, in step S1740, the receiving UE, which has successfully decoded the SCI related to the service A, regardless of whether it is within the communication range of the transmitting UE for the service A, may transmit HARQ feedback to the transmitting UE. For example, when the receiving UE successfully decoded the SCI related to the service A is out of the communication range of the transmitting UE for the service A, if the receiving UE fails to receive the service A, in step S1740, the receiving UE may transmit SL HARQ feedback (i.e., NACK) to the transmitting UE. Then, for example, the receiving UE may re-receive the service A from the transmitting UE. Alternatively, for example, if the receiving UE succeeds in receiving the service A, the receiving UE may not transmit SL HARQ feedback (i.e., ACK). That is, whether the receiving UE is within the communication range of the transmitting UE for a certain service may be independent of whether the receiving UE determines whether to decode the SCI related to the certain service and/or to decode the certain service. In this case, for example, if the receiving UE within the communication range of the transmitting UE for the certain service does not successfully decode the SCI related to the certain service, the receiving UE may transmit SL HARQ feedback (i.e., NACK) to the transmitting UE. In this case, for example, if the receiving UE that has transmitted the SL HARQ feedback does not receive the certain service for a period of time expected for retransmission from the transmitting UE, the receiving UE may consider that SCI decoding has failed and transmit a NACK.

According to an embodiment of the present disclosure, with respect to a certain service, the receiving UE can efficiently determine whether it is within the communication range of the transmitting UE.

Figure 18:
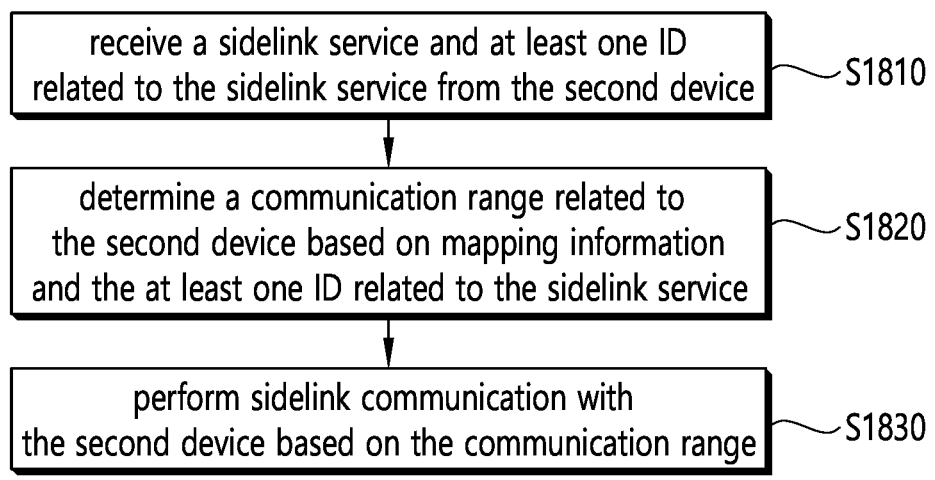
FIG. 18 shows a method for determining whether a first device 100 is within a communication range of a second device 200 for a certain service in accordance with an embodiment of the present disclosure.

FIG. 18 shows a method for determining whether a first device 100 is within a communication range of a second device 200 for a certain service in accordance with an embodiment of the present disclosure.

Referring to FIG. 18, in step S1810, the first device 100 may receive a sidelink service and at least one ID related to the sidelink service from the second device 200. For example, in the case of groupcast sidelink transmission, the first device 100 may transmit a sidelink service and at least one ID related to the sidelink service to one or more second devices 200.

For example, the at least one ID related to the sidelink service may include at least one of a destination ID or a source ID. For example, the at least one ID related to the sidelink service may be included in sidelink control information (SCI). For example, some bits of the at least one ID related to the sidelink service may be used to determine whether the first device 100 is within a communication range of the second device 200. For example, the some bits may be a Most Significant Bit (MSB) or a Least Significant Bit (LSB) of the destination ID. For example, the some bits may be specific bits except for the MSB or LSB of the destination ID. For example, the some bits may be MSB or LSB of the source ID. For example, the some bits may be specific bits except for the MSB or LSB of the source ID.

For example, the sidelink service and the at least one ID related to the sidelink service may be transmitted from an upper layer of the second device 200 to a lower layer. For example, a lower layer of the first device 100 may transmit the sidelink service and the at least one ID related to the sidelink service to an upper layer of the first device 100.

In step S1820, the first device 100 may determine a communication range related to the second device 200 based on mapping information and the at least one ID related to the sidelink service. For example, the mapping information may be information for identifying whether the first device 100 is within the range of the second device 200. For example, the mapping information may be defined for each service. For example, the mapping information may include information related to at least one of location information of the second device 200, a communication range of the sidelink service, or a service type. For example, the information related to at least one of the location information of the second device 200, the communication range of the sidelink service, or the service type may include some bits of the at least one ID related to the sidelink service. For example, the mapping information may include information related to location information of the first device 100. For example, the information related to the location information of the first device 100 may include some bits of the at least one ID related to the sidelink service. For example, the mapping information may be information received from a base station or a network. For example, based on the mapping information and some bits of the at least one ID related to the sidelink service, the first device 100 may determine whether the first device 100 belongs to the communication range of the sidelink service of the second device 200.

In step S1830, the first device 100 may perform sidelink communication with the second device 200 based on the communication range. For example, an upper layer of the first device 100 may transmit triggering information related to hybrid automatic repeat and request (HARQ) feedback to a lower layer of the first device 100. For example, the triggering information may be an indicator or information for triggering a specific operation (e.g., SL HARQ feedback) to a lower layer. For example, the first device 100 may perform HARQ feedback for the second device 200 based on the communication range. For example, the first device 100 may perform HARQ feedback to the second device 200 based on a determination that the first device 100 belongs to the communication range of the sidelink service of the second device 200.

Figure 19:
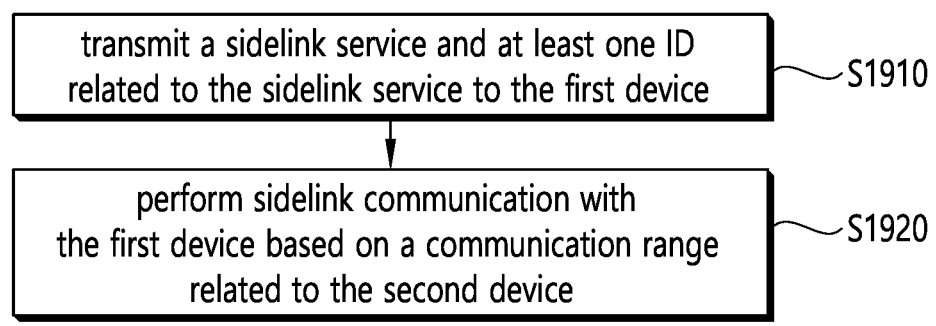
FIG. 19 shows a method for a second device 200 to perform sidelink communication with a first device 100 based on a communication range related to the second device 200 for a certain service in accordance with an embodiment of the present disclosure.

FIG. 19 shows a method for a second device 200 to perform sidelink communication with a first device 100 based on a communication range related to the second device 200 for a certain service in accordance with an embodiment of the present disclosure.

Referring to FIG. 19, in step S1910, the second device 200 may transmit a sidelink service and at least one ID related to the sidelink service to the first device 100. For example, the at least one ID related to the sidelink service may include at least one of a destination ID or a source ID. For example, the at least one ID related to the sidelink service may be included in sidelink control information (SCI). For example, some bits of the at least one ID related to the sidelink service may be used to determine whether the first device 100 is within a communication range of the second device 200. For example, the some bits may be a Most Significant Bit (MSB) or a Least Significant Bit (LSB) of the destination ID. For example, the some bits may be specific bits except for the MSB or LSB of the destination ID. For example, the some bits may be MSB or LSB of the source ID. For example, the some bits may be specific bits except for the MSB or LSB of the source ID.

For example, the sidelink service and the at least one ID related to the sidelink service may be transmitted from an upper layer of the second device 200 to a lower layer. For example, a lower layer of the second device 200 may transmit communication range information (e.g., a minimum required communication range) and/or location information of the second device 200 may be hashed or included in the destination L2 ID received from the upper layer of the second device 200. For example, the communication range information may be range information of a dynamic group communication packet. For example, the lower layer of the second device 200 may hash or include location/area information of the first device 100 (e.g., location/area information of a receiving UE that is a target of packet reception) in the destination L2 ID received from the upper layer of the second device 200. Alternatively, for example, the lower layer of the second device 200 may change the destination L2 ID to the destination L1 ID according to a pre-defined rule/function. In this case, for example, the destination L2 ID may not include location information of the second device 200, communication range information, and/or location/area information of the first device 100.

In step S1920, the second device 200 may perform sidelink communication with the first device 100 based on a communication range related to the second device 200. For example, the communication range related to the second device 200 may be determined based on mapping information and the at least one ID related to a sidelink service. For example, the communication range related to the second device 200 may be determined by the first device 100 based on mapping information and the at least one ID related to a sidelink service. For example, the mapping information may be information for identifying whether the first device 100 is within the range of the second device 200. For example, the mapping information may be defined for each service. For example, the mapping information may include information related to at least one of location information of the second device 200, a communication range of the sidelink service, or a service type. For example, the information related to at least one of the location information of the second device 200, the communication range of the sidelink service, or the service type may include some bits of the at least one ID related to the sidelink service. For example, the mapping information may include information related to location information of the first device 100. For example, the information related to the location information of the first device 100 may include some bits of the at least one ID related to the sidelink service. For example, the mapping information may be information received from a base station or a network. For example, based on the mapping information and some bits of the at least one ID related to the sidelink service, whether the first device 100 belongs to the communication range of the sidelink service of the second device 200 may be determined by the first device 100.

For example, the second device 200 may receive HARQ feedback from the first device 100. For example, based on the determination that the first device 100 belongs to the communication range of the sidelink service of the second device 200, the second device 200 may receive the second HARQ feedback from the first device 100.

Since examples of the above-described proposed method may also be included as one of the implementation methods of the present disclosure, it is obvious that they may be regarded as a kind of proposed method. In addition, the above-described proposed methods may be implemented independently, but may also be implemented in the form of a combination (or merge) of some of the proposed methods. A rule may be defined so that the base station informs the terminal of whether the proposed methods are applied or not (or information about the rules of the proposed methods), or the transmitting terminal informs the receiving terminal through a predefined signal (e.g., physical layer signal or higher layer signal).

Various embodiments of the present disclosure may be applied not only to vehicle-to-vehicle communication, but also to vehicle-to-pedestrian communication, vehicle-to-base station communication, or vehicle-to-fixed node communication. For example, in communication with a base station, the position and speed of the counterpart receiver may be regarded as fixed.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
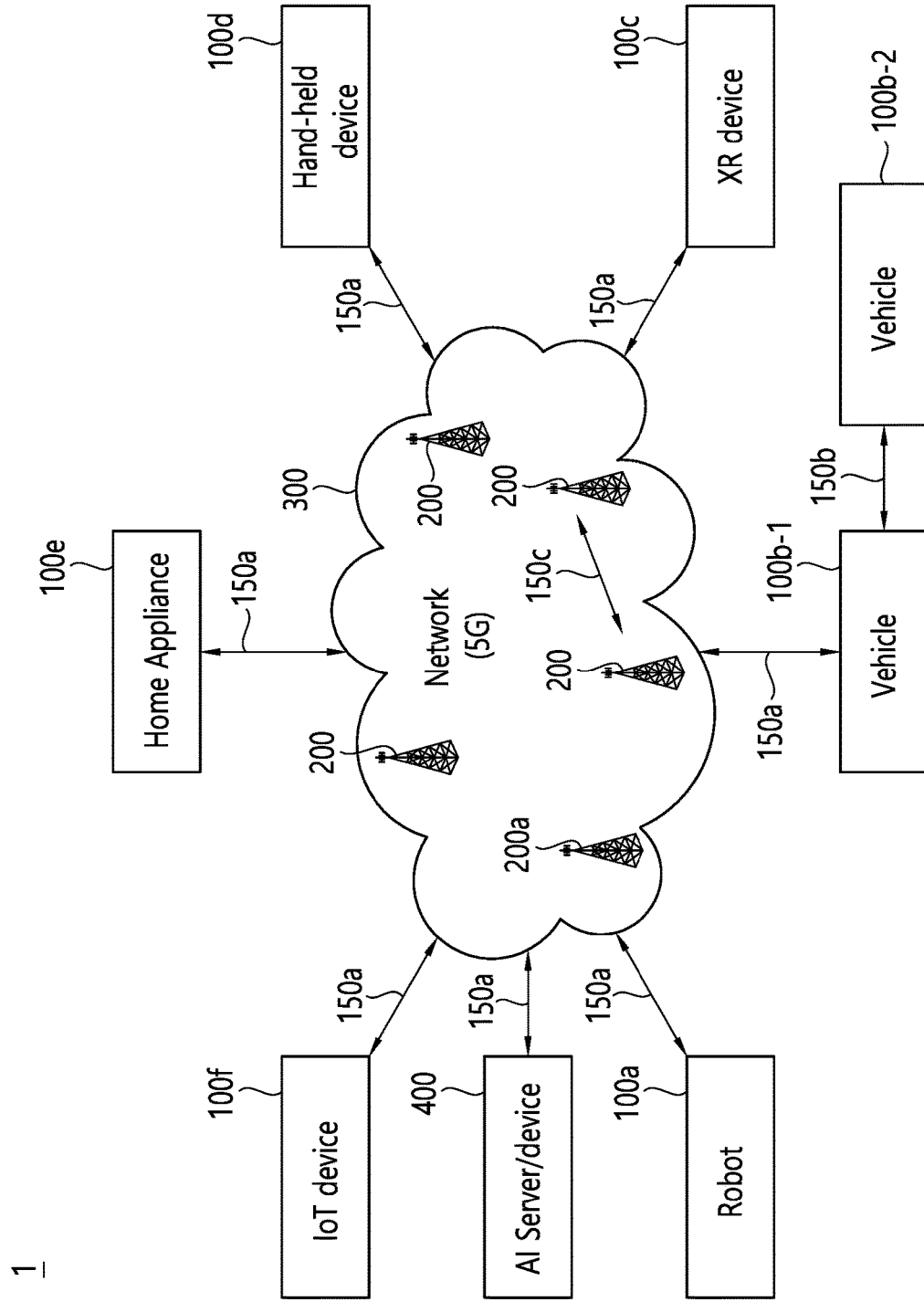
FIG. 20 shows a communication system 1, in accordance with an embodiment of the present disclosure.

FIG. 20 shows a communication system 1, in accordance with an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
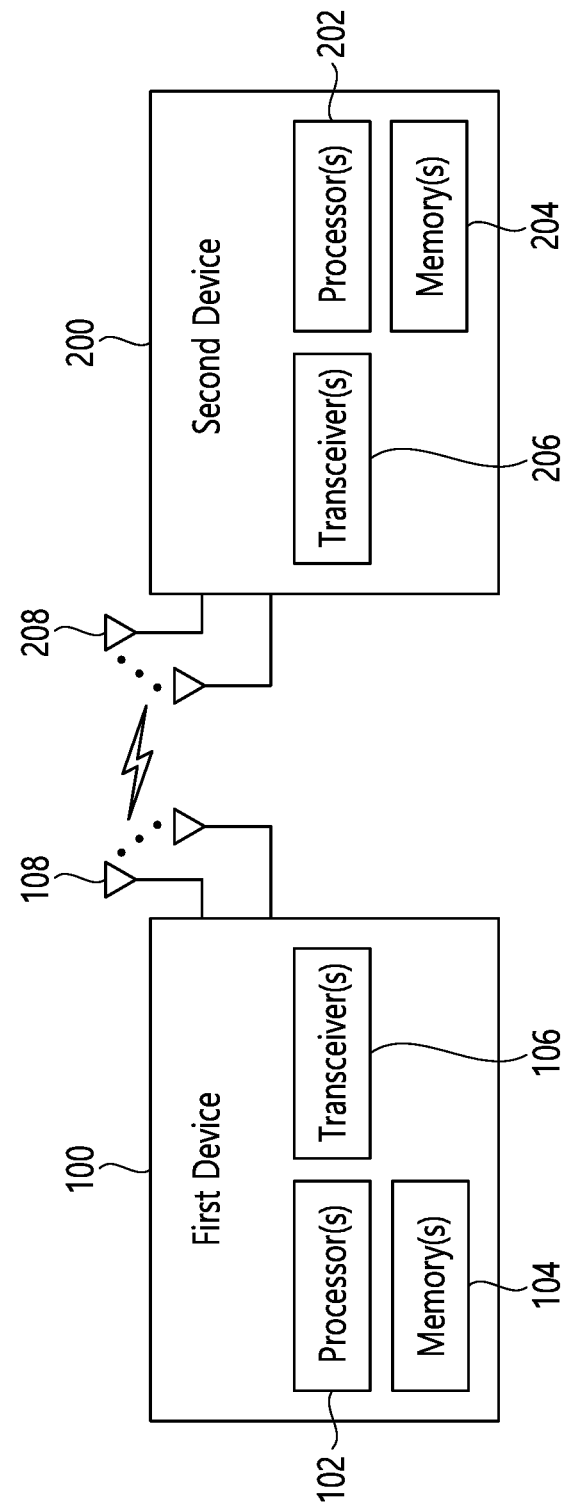
FIG. 21 shows wireless devices, in accordance with an embodiment of the present disclosure.

FIG. 21 shows wireless devices, in accordance with an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
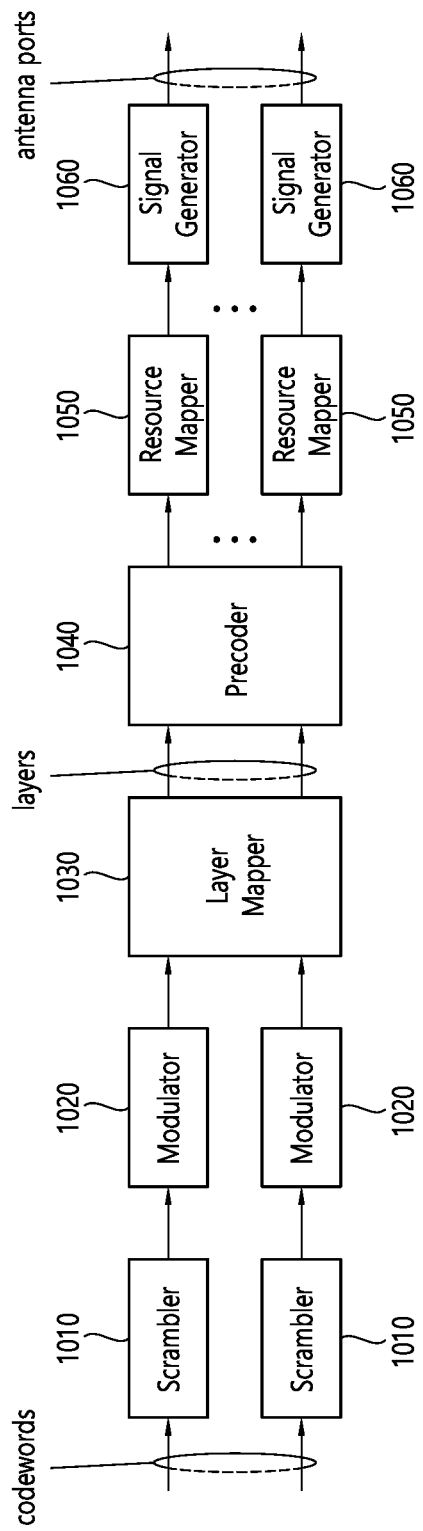
FIG. 22 shows a signal process circuit for a transmission signal, in accordance with an embodiment of the present disclosure.

FIG. 22 shows a signal process circuit for a transmission signal, in accordance with an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
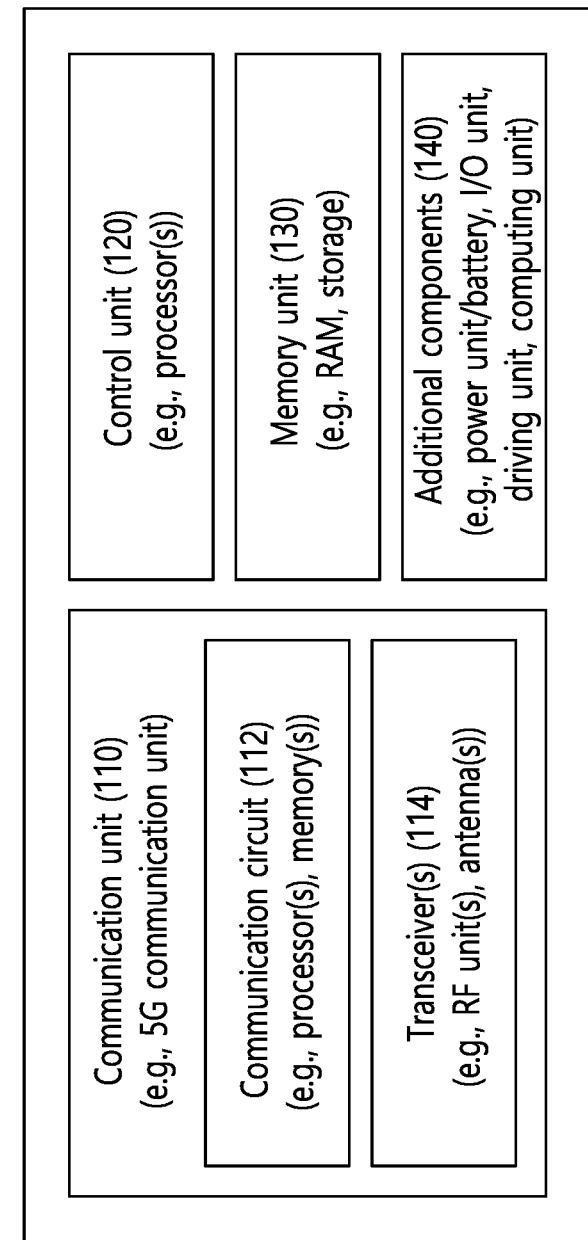
FIG. 23 shows a wireless device, in accordance with an embodiment of the present disclosure.

FIG. 23 shows another example of a wireless device, in accordance with an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
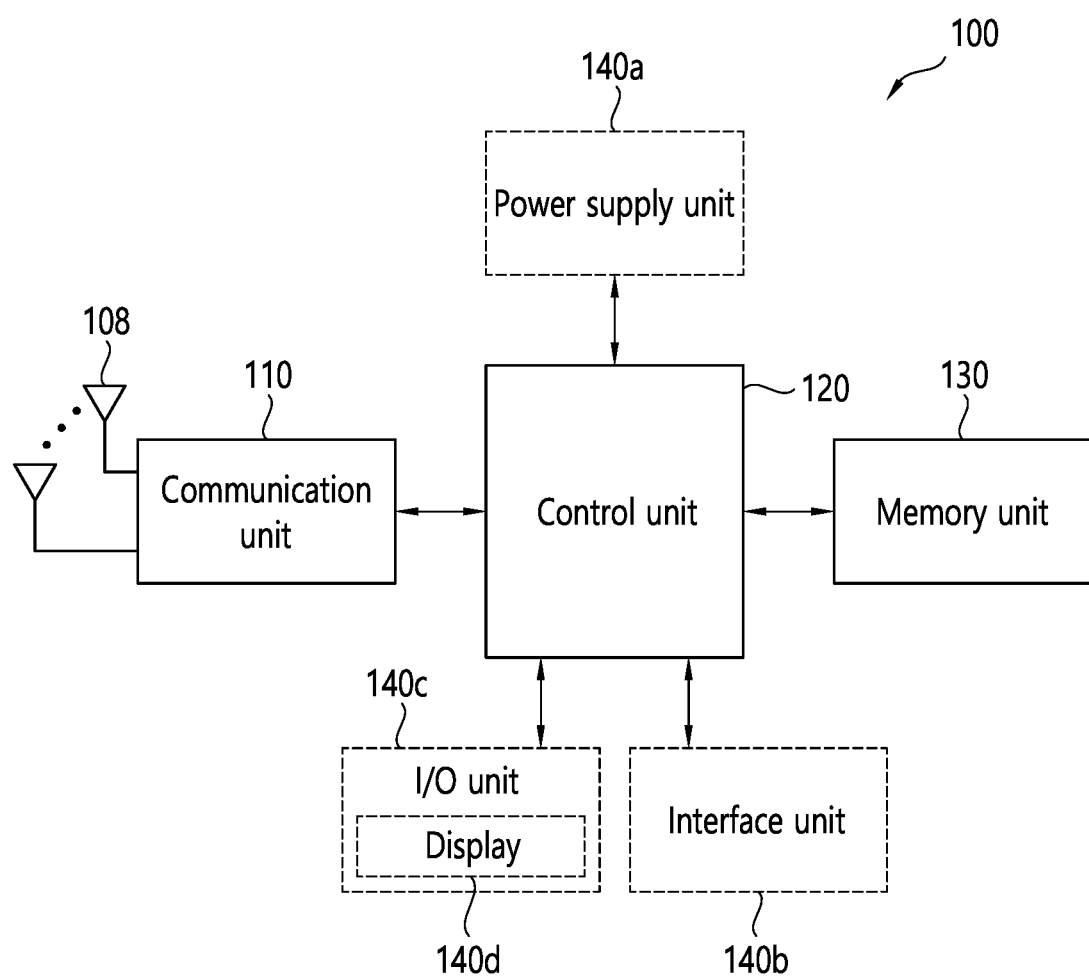
FIG. 24 shows a hand-held device, in accordance with an embodiment of the present disclosure.

FIG. 24 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 25 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   obtaining mapping information for mapping between a communication range and at least one of source identity (ID) or destination identity (ID);
   receiving, from a second device, a service and control information including at least one of a source ID related to the service or a destination ID related to the service;
   identifying, based on the mapping information and the at least one of the source ID related to the service or the destination ID related to the service, the communication range of the second device for the service; and
   transmitting, to the second device, based on the first device being within the communication range of the second device for the service, hybrid automatic repeat request (HARQ) feedback in response to the receiving of the service.

2. The method of claim 1,
   wherein the mapping information includes information related to at least one of location information of the second device.

3. The method of claim 2,
   wherein the information related to the at least one of the location information of the second device, the communication range of the second device for the service includes at least one bit of the at least one of the source ID related to the service or the destination ID related to the service.

4. The method of claim 1, wherein the mapping information includes information related to location information of the first device.

5. The method of claim 1, wherein the mapping information is information received from a base station.

6. The method of claim 1, wherein the identification of the communication range of the second device for the service is based on the mapping information and at least one bit of the at least one of the source ID related to the service or the destination ID related to the service.

7. The method of claim 1, wherein, based on that the first device is within the communication range of the second device for the service and based on a failure of the reception of the service, the HARQ feedback includes information related to negative acknowledgement (NACK).

8. The method of claim 1, wherein, based on that the first device is not within the communication range of the second device for the service, the HARQ feedback is not transmitted to the second device.

9. The method of claim 8,
   wherein, based on that the first device is not within the communication range of the second device for the service and based on a failure of the reception of the service, the HARQ feedback related to NACK is not transmitted to the second device.

10. The method of claim 1, wherein the mapping information is pre-configured.

11. The method of claim 1,
    wherein the at least one of source ID related to the service or destination ID related to the service is transmitted from a lower layer of the first device to an upper layer of the first device in response to the reception of the service,
    wherein the mapping information is obtained by the upper layer of the first device, and
    wherein the determination of the communication range of the second device for the service is performed by the upper layer of the first device.

12. The method of claim 11,
wherein, based on that the first device is within the communication range of the second device for the service, information related to the first device being within the communication range of the second device for the service is transmitted from the upper layer of the first device to the lower layer of the first device, and
wherein the HARQ feedback is triggered based on the information related to the first device being within the communication range of the second device for the service.

13. The method of claim 12,
wherein the information related to the first device being within the communication range of the second device for the service includes the at least one of source ID related to the service or destination ID related to the service.

14. The method of claim 13, wherein the upper layer is an application layer.

15. The method of claim 14, wherein the lower layer is at least one of a radio resource control (RRC) layer, a medium access control (MAC) layer, or a physical layer.

16. The method of claim 1,
wherein the control information is sidelink control information (SCI),
wherein the service is a sidelink service, and
wherein the HARQ feedback is sidelink HARQ feedback.

17. A first device adapted to perform wireless communication, the first device comprising:
at least one transceiver;
at least one processor; and
at least one memory connected to the at least one processor and storing instructions that, based on being executed, cause the first device to perform operations comprising:
obtaining mapping information for mapping between a communication range and at least one of source identity (ID) or destination identity (ID);
receiving, from a second device, a service and control information including the at least one of the source ID related to the service or the destination ID related to the service;
identifying, based on the mapping information and the at least one of the source ID related to the service or the destination ID related to the service, the communication range of the second device for the service; and
transmitting, to the second device, based on the first device being within the communication range of the second device for the service, hybrid automatic repeat request (HARQ) feedback in response to the receiving of the service.

18. A processing device adapted to control a first device, the processing device comprising:
at least one processor; and
at least one memory connected to the at least one processor and storing instructions that, based on being executed, cause the first device to perform operations comprising:
obtaining mapping information for mapping between a communication range and at least one of source identity (ID) or destination identity (ID);
receiving, from a second device, a service and control information including the at least one of the source ID related to the service or the destination ID related to the service;
identifying, based on the mapping information and the at least one of the source ID related to the service or the destination ID related to the service, the communication range of the second device for the service; and
transmitting, to the second device, based on the first device being within the communication range of the second device for the service, hybrid automatic repeat request (HARQ) feedback in response to the receiving of the service.

* * * * *